United States Patent
Yokoyama

(10) Patent No.: US 9,635,205 B2
(45) Date of Patent: Apr. 25, 2017

(54) APPARATUS THAT PRODUCES GUIDANCE DISPLAY INTERLOCKED WITH HUMAN SENSOR, CONTROL METHOD OF THE APPARATUS, AND STORAGE MEDIUM

(71) Applicant: CANON KABUSHIKI KAISHA, Tokyo (JP)

(72) Inventor: Junnosuke Yokoyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/938,174

(22) Filed: Nov. 11, 2015

(65) Prior Publication Data
US 2016/0142575 A1 May 19, 2016

(30) Foreign Application Priority Data
Nov. 13, 2014 (JP) .................. 2014-230849

(51) Int. Cl.
*H04N 1/00* (2006.01)
*H04W 4/00* (2009.01)
*G06K 9/00* (2006.01)

(52) U.S. Cl.
CPC ..... *H04N 1/00896* (2013.01); *H04N 1/00204* (2013.01); *H04N 1/00246* (2013.01); *H04W 4/008* (2013.01); *H04N 2201/0094* (2013.01); *Y02B 60/50* (2013.01)

(58) Field of Classification Search
CPC ........... H04N 1/00896; H04N 1/00246; H04N 1/00204; H04N 2201/0094; H04W 4/008; G06K 9/00369
See application file for complete search history.

(56) References Cited

U.S. PATENT DOCUMENTS

| 8,823,967 | B2 | 9/2014 | Mamiya et al. |
| 2012/0182568 | A1* | 7/2012 | Isogai ................ G03G 15/5004 358/1.13 |
| 2014/0153017 | A1* | 6/2014 | Watanabe ............. G06F 3/1212 358/1.13 |
| 2014/0157032 | A1* | 6/2014 | Yokoyama ............ G06F 1/3215 713/323 |

FOREIGN PATENT DOCUMENTS

| JP | 2010263484 A | 11/2010 |
| JP | 2012114499 A | 6/2012 |

* cited by examiner

*Primary Examiner* — Iriana Cruz
(74) *Attorney, Agent, or Firm* — Rossi, Kimms & McDowell LLP

(57) ABSTRACT

An apparatus having a plurality of operation modes including at least a normal power mode and a power-saving mode in which power consumption is lower than that in the normal power mode comprises: a human sensor configured to detect a person who exists within a predetermined range of the apparatus; a communication unit configured to wirelessly communicate with external equipment that is held above the apparatus; a first guidance display unit configured to indicate a position where the external equipment is held above by lighting; and a control unit configured to control, in the case where the human sensor detects a person in the power-saving mode, the communication unit to enter a state where communication with the external equipment can be performed and the first guidance display unit to turn the light on.

13 Claims, 25 Drawing Sheets

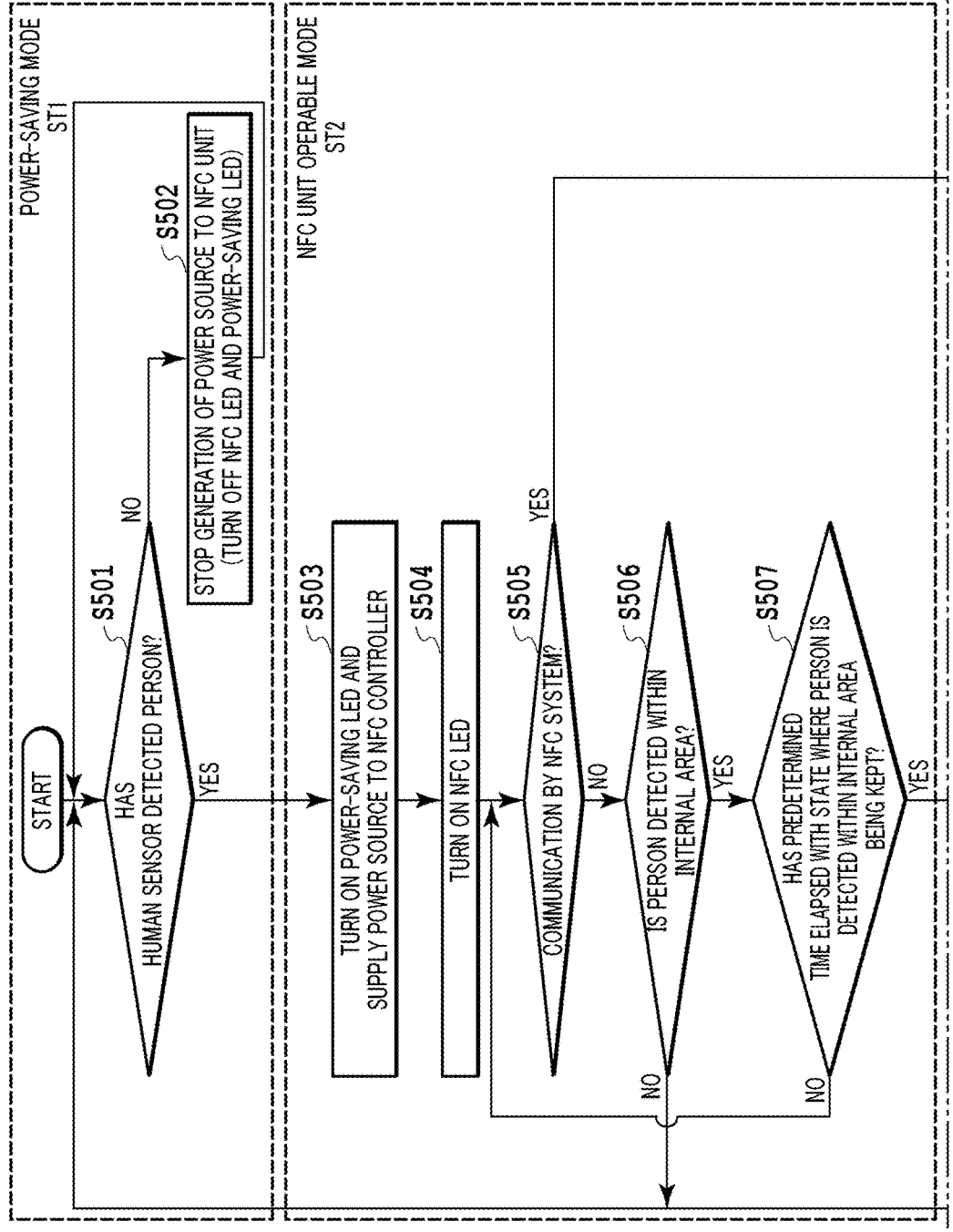

<POWER-SAVING MODE ST1>

<LOGIN STANDBY MODE ST3>

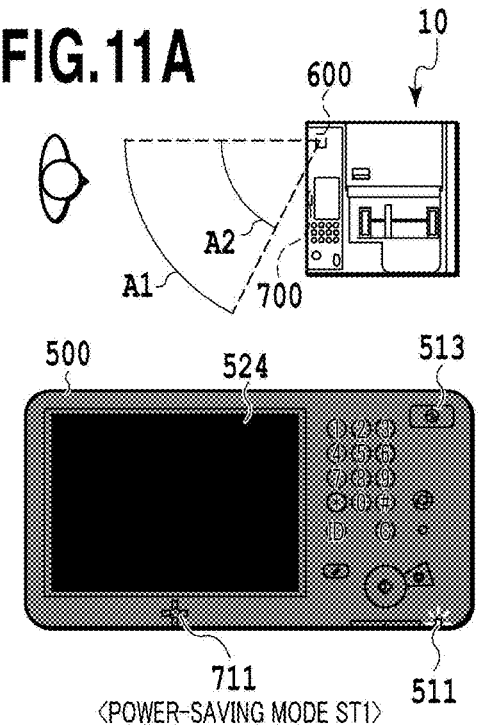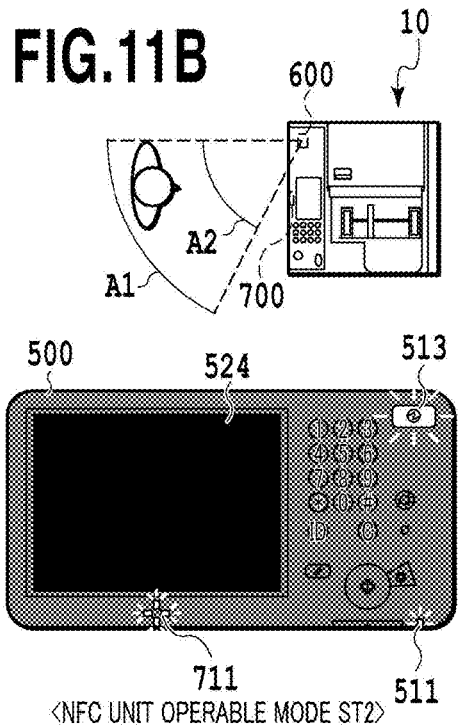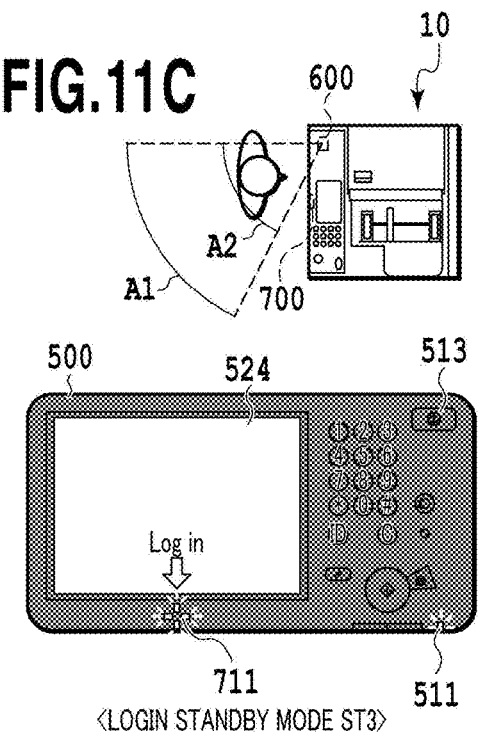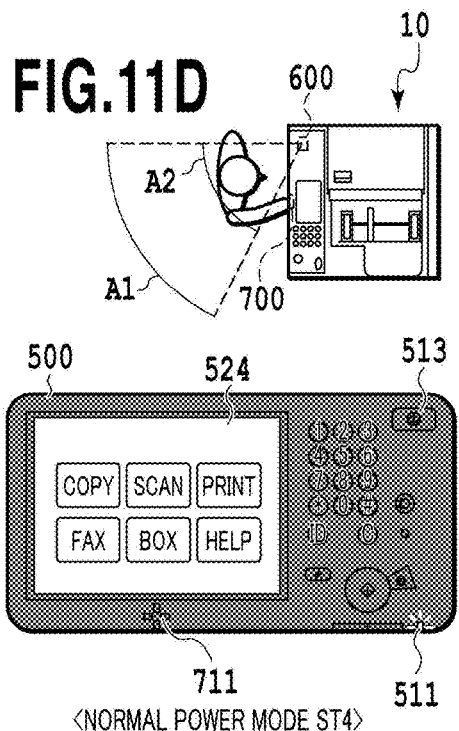

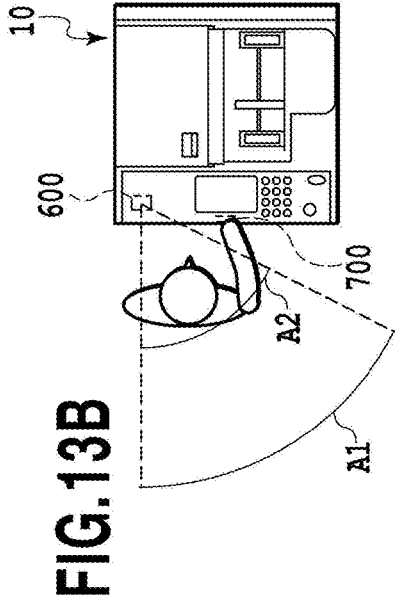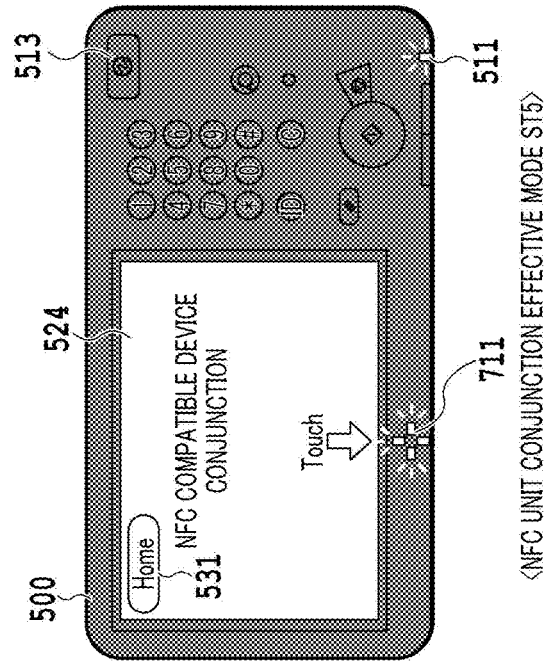
FIG.13A
<NORMAL POWER MODE ST4>
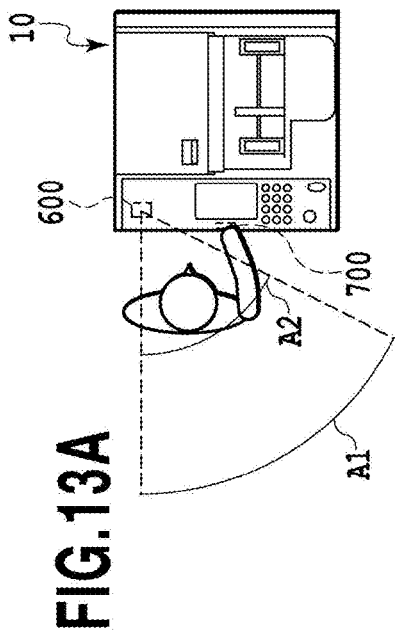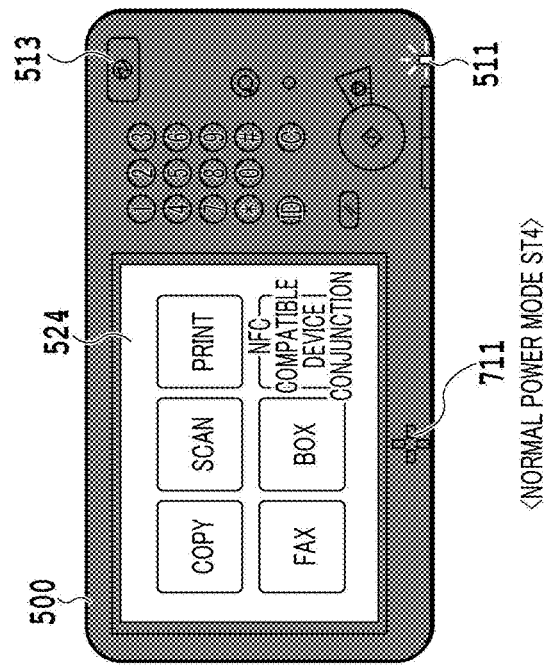
FIG.13B
<NFC UNIT CONJUNCTION EFFECTIVE MODE ST5>

<POWER-SAVING MODE ST1'>

<LOGIN STANDBY MODE ST3'>

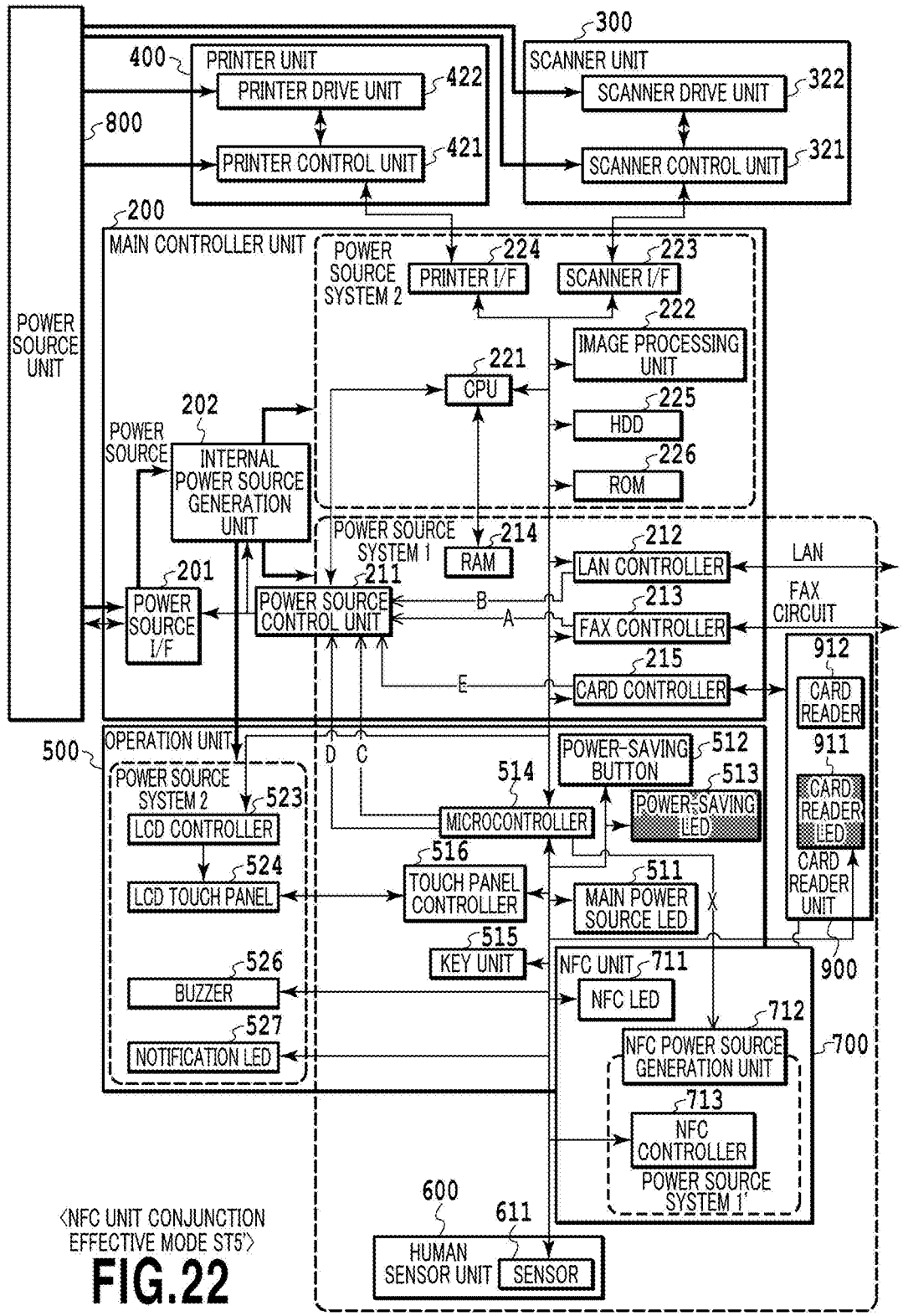

⟨POWER-SAVING MODE ST1'⟩

⟨CARD READER UNIT OPERABLE MODE ST2'⟩

⟨LOGIN STANDBY MODE ST3'⟩

<NORMAL POWER MODE ST4'>

<NFC UNIT CONJUNCTION EFFECTIVE MODE ST5'>

APPARATUS THAT PRODUCES GUIDANCE DISPLAY INTERLOCKED WITH HUMAN SENSOR, CONTROL METHOD OF THE APPARATUS, AND STORAGE MEDIUM

BACKGROUND OF THE INVENTION

Field of the Invention

The present invention relates to a guidance display technique in an apparatus capable of communicating with a device compatible with near field communication by returning power from a power-saving mode in which power consumption is lower than that at the time of the normal operation to a normal power mode in response to a human sensor.

Description of the Related Art

Conventionally, a user is caused to press down a button (hereinafter, a power-saving button) to release the power-saving mode at the time of returning the apparatus having the power-saving mode from the power-saving mode. For example, in a recent image forming apparatus, a so-called guidance display is produced by lighting up the power-saving button so that a user easily recognizes the position of the power-saving button. However, there are many users who are confused about the position of the power-saving button, and therefore, an image forming apparatus that automatically returns from the power-saving mode without the need to press down the power-saving button has appeared. For example, Japanese Patent Laid-Open No. 2012-114499 has disclosed the technique to return from the power-saving mode (to release the power-saving mode) by using two human sensors with different characteristics. Specifically, the technique is characterized in that: the movement of a person who is approaching the apparatus is detected by the first human sensor and the arrival of the person at the front of the apparatus is detected by the second human sensor; and in the case where the movement of the person is no longer detected by the first human sensor in the state where the second sensor detects that the person remains in front of the apparatus, it is determined that the person is a user who stops in front of the apparatus and has the intension of operating the apparatus.

As another function, a recent image forming apparatus includes a customized screen display function dedicated to each user and an ID authentication function to securely print a document of each user. For example, Japanese Patent Laid-Open No. 2010-263484 has disclosed the technique to display a customized screen unique to a user by including an NFC reader/writer and reading information held within an NFC compatible device, such as a smart phone.

In the case of the image forming apparatus that uses such a human sensor as disclosed in Japanese Patent Laid-Open No. 2012-114499, there is a possibility that the human sensor will not work correctly depending on the position where a user stands, and therefore, the power-saving mode will not be released automatically. In such a case, there is a possibility that a user cannot determine immediately whether the power-saving mode is released automatically in response to the human sensor or it is necessary for the user to press down the power-saving button, and therefore, a user will wait for the reaction of the apparatus in front of the image forming apparatus.

Further, in order to bring about a state where the communication by the NFC system can be performed at all times in the image forming apparatus adopting the technique of Japanese Patent Laid-Open No. 2010-263484, it is necessary to supply power to the NFC reader/writer at all times. However, in the case where the supply of power is cut off because of the power-saving mode or the like, it is no longer possible to perform communication even by performing the operation to touch the NFC compatible device. Consequently, at the time of the power-saving mode or the like, the user will be confused because it is not possible to determine whether the image forming apparatus is in the state where the communication by the NFC system can be performed, whether it is necessary to press down, for example, the power-saving button, in advance in order to enable communication, which operation the user should perform, etc.

SUMMARY OF THE INVENTION

An apparatus according to the present invention is an apparatus having a plurality of operation modes including at least a normal power mode and a power-saving mode in which power consumption is lower than that in the normal power mode, and includes: a human sensor configured to detect a person who exists within a predetermined range of the apparatus; a communication unit configured to wirelessly communicates with external equipment that is held above the apparatus; a first guidance display unit configured to indicate the position where the external equipment is held above by lighting; and a control unit configured to control, in the case where the human sensor detects a person in the power-saving mode, the communication unit to enter a state where communication with the external equipment can be performed and the first guidance display unit to turn the light on.

Further features of the present invention will become apparent from the following description of exemplary embodiments (with reference to the attached drawings).

BRIEF DESCRIPTION OF THE DRAWINGS

FIG. 5 is a diagram showing relationship between FIGS. 5A and 5B;

FIGS. 5A and 5B are flowcharts showing a flow of control processing of the operation mode in the image forming apparatus according to the first embodiment;

FIGS. 11A to 11D are diagrams each showing an example of a guidance display using an LED on the operation unit according to the first embodiment;

FIGS. 13A and 13B are diagrams each showing a display state using an LED on an operation unit according to the second embodiment;

FIG. 22 is a diagram showing a state where power is supplied to each unit constituting the image forming apparatus in an NFC unit conjunction effective mode of the third embodiment.

DESCRIPTION OF THE EMBODIMENTS

In the following, with reference to the attached drawings, the present invention is explained in detail based on preferred embodiments. Configurations shown in the following embodiments are merely exemplary and the present invention is not limited to the configurations shown schematically.

First Embodiment

Figure 1A:
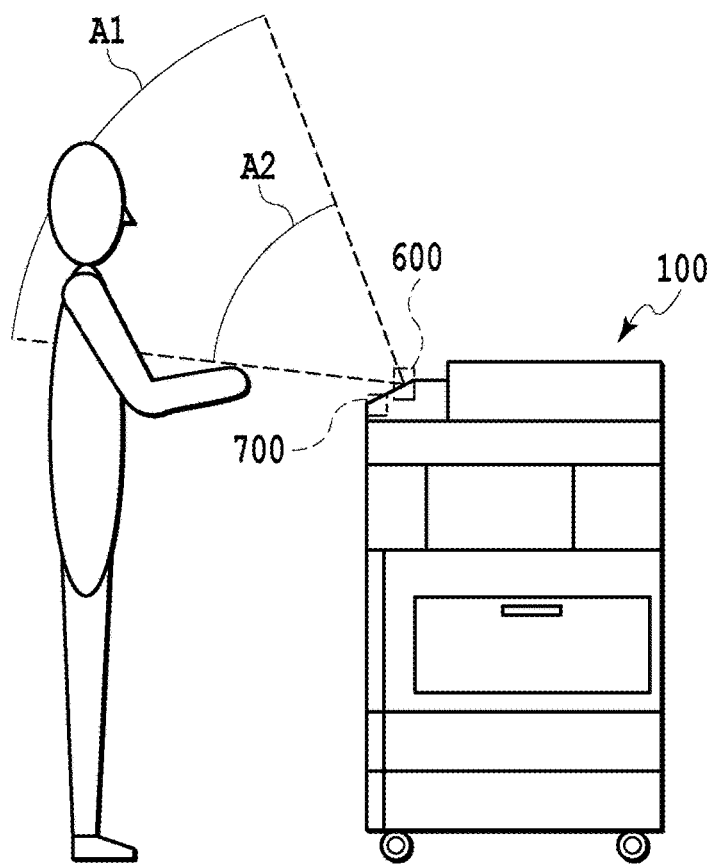
FIGS. 1A and 1B are external views showing an image forming apparatus and a user who uses the image forming apparatus.
Figure 1B:
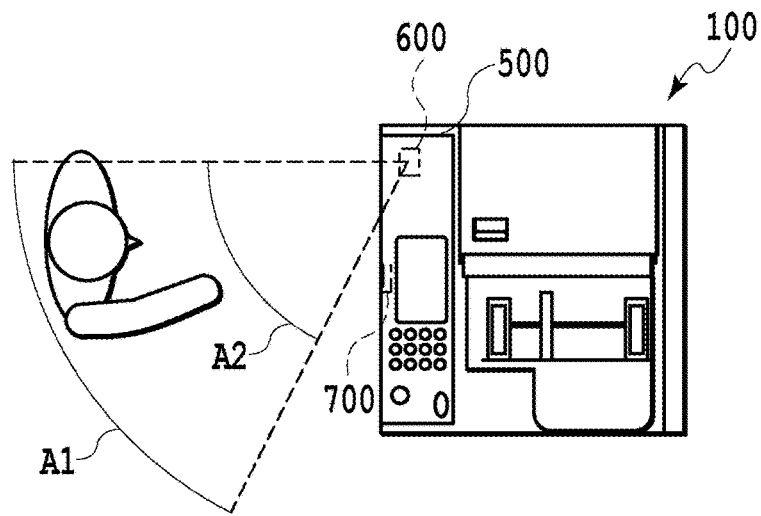

FIGS. 1A and 1B are external views each showing an image forming apparatus and a user who uses the image forming apparatus, and FIG. 1A is a diagram viewed from the side surface and FIG. 1B is a diagram viewed from the top surface.

An image forming apparatus 100 is an MFP (Multi Function Peripheral) including a plurality of functions, such as a print function, a scanner function, a copy function, and a FAX function. The image forming apparatus 100 includes a human sensor unit 600 configured to detect a person who is approaching the apparatus. In the case where the human sensor unit 600 detects a person who is approaching, the image forming apparatus 100 returns from the power-saving mode in which power consumption is suppressed to the power state where one of the above-described plurality of functions can be used.

The human sensor unit 600 is, for example, an infrared array sensor, and is capable of detecting the distance between the position of a person and the image forming apparatus 100 based on the distribution of the received infrared light intensity by receiving the infrared light that is radiated due to the body temperature of a person with light reception units arranged in the form of a line or matrix. Then, it is possible for the human sensor unit 600 to detect a person who exists within a predetermined range of the image forming apparatus 100 at least in two stages of distance. In other words, the human sensor unit 600 has detection ranges in two or more stages and in the present embodiment, the human sensor unit 600 has detection areas in two stages: an external detection area A1 and an internal detection area A2. Due to the detection areas at least in two or more stages, a state where a user is detected in a position distant from the image forming apparatus 100 is distinguished from a state where a user is detected in a position close to the image forming apparatus 100. The human sensor unit 600 is arranged so that the detection area is located above, and therefore, it is possible for the human sensor unit 600 to detect a person without the influence of an obstacle, such as a computer placed on a desk. As long as it is possible to set the detection area in two stages, the sensor may be arranged so as to face the front or downward, in addition to upward.

The human sensor unit 600 is not limited to the above-described infrared array sensor and any sensor capable of detecting existence of a person and a change in distance may be used. For example, it may also be possible to use an ultrasonic sensor that outputs a pulse wave having a frequency of 40 KHz in an non-audible range, receives a reflected wave of the pulse wave reflected from an object, and measures the distance between the apparatus and the object based on the time taken from the output of the pulse wave until the reception of the reflected wave. Further, it may also be possible to use an infrared reflection sensor that receives radiated infrared light, or a capacitive sensor that measures the distance between the sensor and a target object based on the capacitance between the sensor and the target object.

Further, the image forming apparatus 100 includes an NFC unit 700 having an antenna for communicating with external equipment by using the near field communication (NFC) system. For example, the NFC unit 700 includes a reader function to read information on an NFC compatible device (NFC compatible authentication card or the like) that is held above the NFC unit 700. Further, the NFC unit 700 also has a writer function to write IP address information, data, etc., of the image forming apparatus 100 to NFC compatible mobile equipment, such as a smart phone, which is held above the NFC unit 700. In the present embodiment, the NFC unit 700 is incorporated in an operation unit 500 of the image forming apparatus 100, but the NFC unit 700 may be arranged in any position of the image forming apparatus 100 where it is easy for a user to perform the touch operation.

Figure 2:
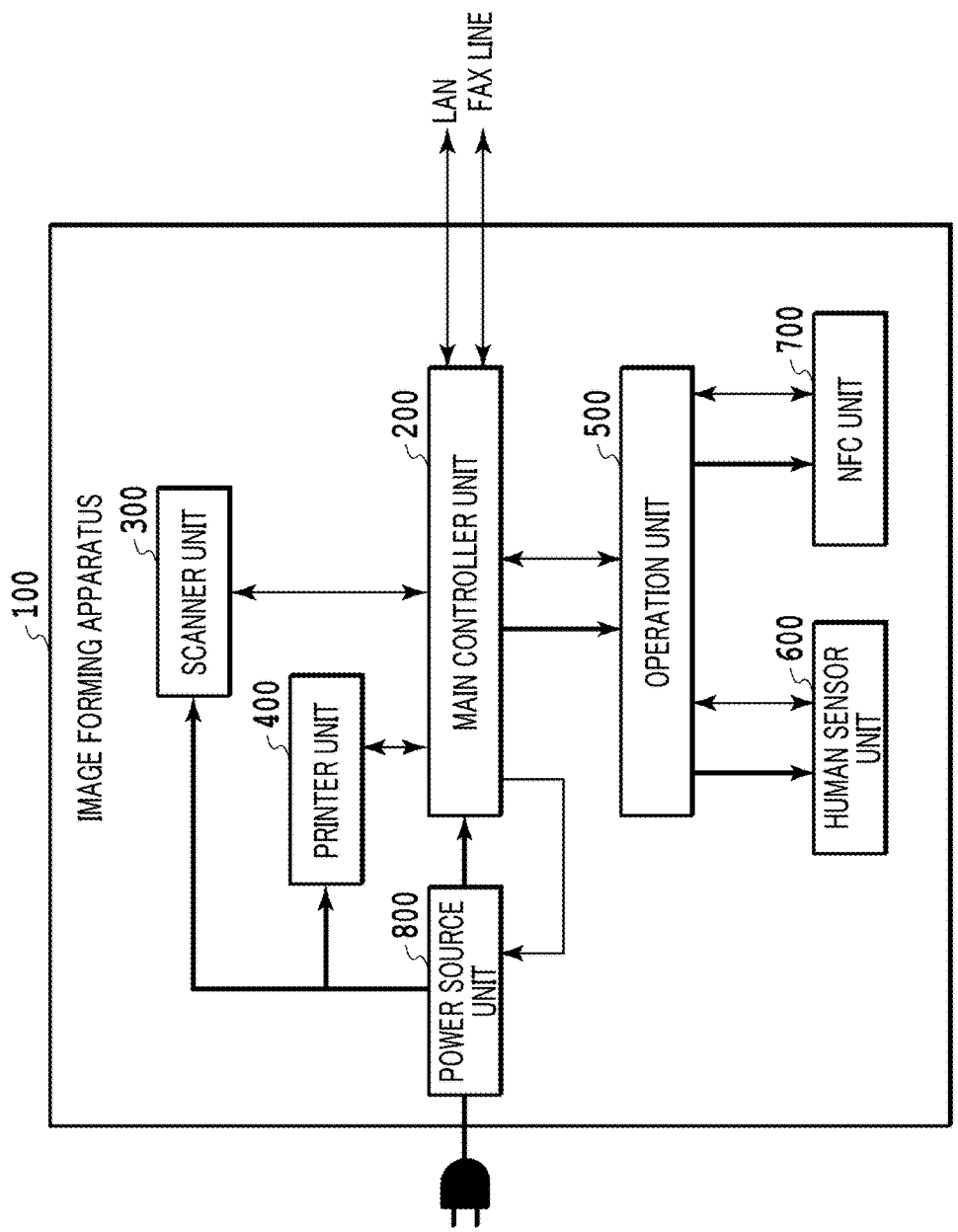
FIG. 2 is a simplified function block diagram of an image forming apparatus according to a first embodiment.
Figure 3:
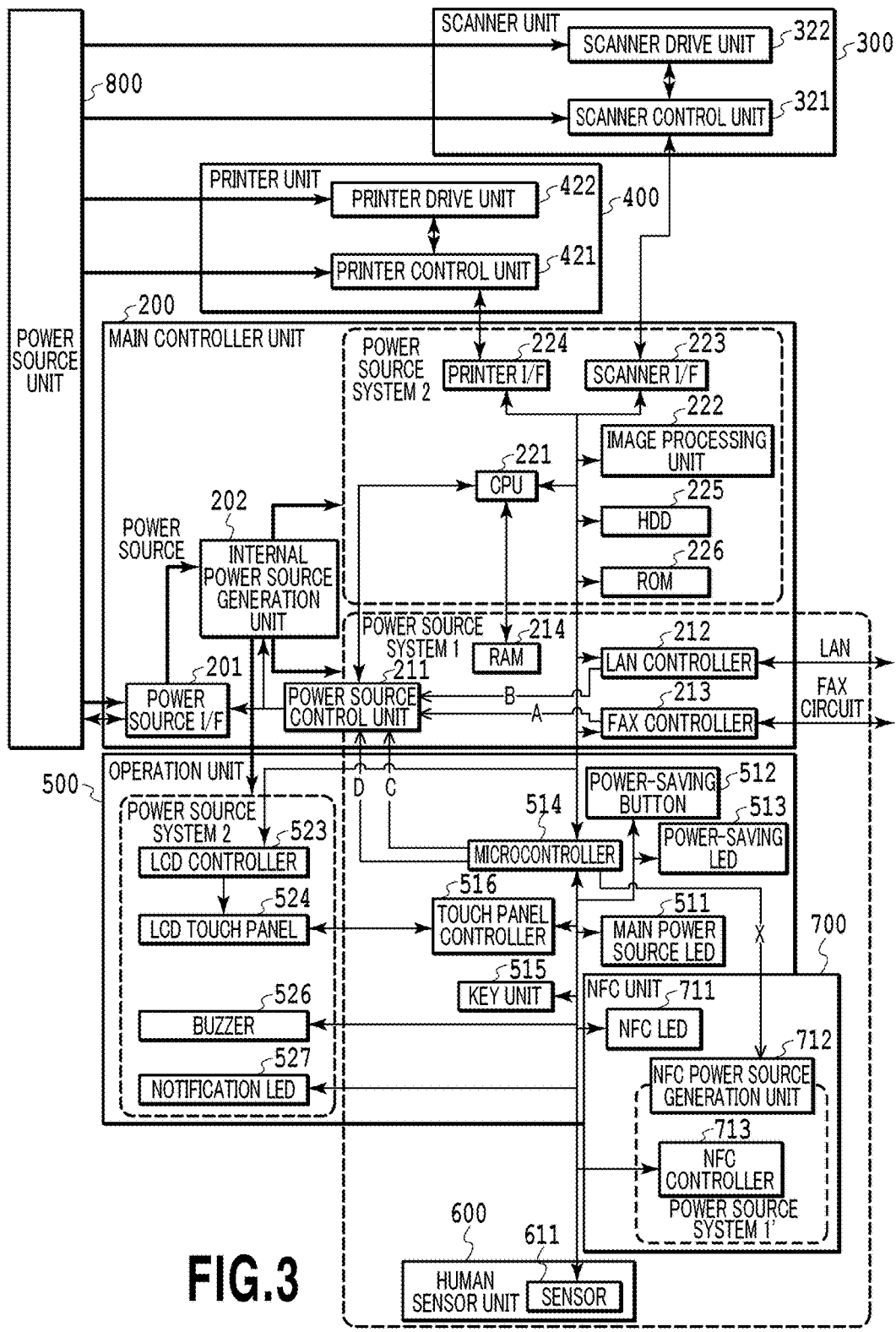
FIG. 3 is a block diagram showing details of each component (function unit) of the image forming apparatus according to the first embodiment.

FIG. 2 is a simplified function block diagram of the image forming apparatus 100 according to the present embodiment. The image forming apparatus 100 includes a main controller unit 200, a scanner unit 300, a printer unit 400, the operation unit 500, the human sensor unit 600, the NFC unit 700, and a power source unit 800. FIG. 3 is a block diagram showing details of each component (function unit) shown in FIG. 2. In the following, each component is explained with reference to FIG. 2 and FIG. 3.

The main controller unit 200 generates print image data to be used in the printer unit 400 by performing processing on image data that is input from the scanner unit 300 or the like, and centralizedly controls each unit, such as the scanner unit 300 and the printer unit 400, in response to user's instructions that are input to the operation unit 500. Further, the main controller unit 200 controls the power mode of the image forming apparatus 100 by controlling the power source unit 800.

The main controller unit 200 is separated into at least two power source systems: a power source system 1 that is required to operate also in the power-saving mode and a power source system 2 that is not required to operate in the power-saving mode. To the power source system 1, power is supplied at all times by an internal power source generation unit 202 having received the supply of power source from a power source I/F 201. To the power source system 1, a power source control unit 211, a LAN controller 212, and a FAX controller 213 are connected so that it is possible to respond to the case where a FAX is received or a print request is made from a network even in the power-saving mode of the apparatus. To the power source system 2, a ROM 226 that is necessary at the time of activation, an image processing unit 222 that is necessary at the time of the copy operation, a scanner I/F 223, a printer I/F 224, and an HDD 255 are connected and no power is supplied in the power-saving mode. In the case where one of interrupt signals A to D is input from each unit that is connected to the power source control unit 211 in the power-saving mode, the power source control unit 211 releases the power-saving mode by controlling the internal power source generation unit 202 to supply power to the power source system 2. Here, the interrupt signal is explained.

The interrupt signal A is a signal that is output from the FAX controller 213 and is output in the case where a FAX is received from a FAX line.

The interrupt signal B is a signal that is output from the LAN controller 212 and is output in the case where a print job packet or state check packet is received.

The interrupt signals C and D are signals that are output from a microcontroller 514 inside the operation unit 500. Details will be described later.

In the case where power is supplied also to the power source system 2 inside the main controller 200 by the interrupt signals A to D, the state information is read from the RAM 214 that has been self-refreshing in the power source system 1 in order to return the apparatus into the state (normal power mode) before the transition into the power-saving mode. After the image forming apparatus 100 returns to the normal power mode, processing in accordance with the return factor of the interrupt signals A to D is performed by the CPU 221.

The scanner unit 300 generates image data by optically reading a document that is set on a document table, not shown. The scanner unit 300 consists of a scanner control unit 321 and a scanner drive unit 322. The scanner drive unit 322 includes a drive unit configured to move a read head for reading a document, a drive unit configured to convey a document as far as a read position, etc. The scanner control unit 321 acquires scan setting information that is set by a user from the main controller unit 200 and controls the operation of the scanner drive unit 322 based on the acquired scan setting information.

The printer unit 400 forms an image on a printing medium (sheet) in accordance with, for example, the electrophotographic system. The printer unit 400 consists of a printer control unit 421 and a printer drive unit 422. The printer drive unit 422 includes a motor for rotating a photoconductor drum, a mechanism unit configured to apply pressure to a fixing unit, a heater, etc. The printer control unit 421 acquires print setting information that is set by a user from the main controller unit 200 and controls the operation of the printer drive unit 422 based on the acquired print setting information.

The operation unit 500 has an LCD touch panel 524 that is obtained by integrating an LCD panel and a touch panel into one unit, a key unit 515 configured to detect the key operation of a user, such as the ten-key operation and the start key operation, and a buzzer 526. On the LCD touch panel 524, image data that is received by an LCD controller 523 from the main controller 200 is drawn. In the case where a user touches and operates on the screen of the LCD touch panel 524, a touch panel controller 516 analyzes the data of the coordinates of the touched portion and notifies the microcontroller 514 of the analysis results, and the microcontroller 514 notifies the CPU 221 of the analysis results. The microcontroller 514 periodically checks the key operation performed to the key unit 515 and in the case where there is a key operation by a user, the microcontroller 514 notifies the CPU 221 of the key operation. Upon receipt of the notification to the effect that there has been an input operation to the LCD touch panel 524 or the key unit 515, the CPU 221 causes the image forming apparatus 100 to operate in accordance with the contents of the operation. Further, in the operation unit 500, a plurality of LEDs is incorporated. A main power source LED 511 is an LED that is always kept in the lit state while the main power source of the image forming apparatus 100 is in the turned-on state. A notification LED 527 is controlled by the microcontroller 514 and notifies a user of the state of the image forming apparatus 100, such as the state where a job is being performed and the state where an error has occurred.

Then, the inside of the operation unit 500 is also separated into at least two power source systems: the power source system 1 that is required to operate also in the power-saving mode and the power source system 2 that is not required to operate in the power-saving mode. The power source system 1 includes the microcontroller 514, the main power source LED 511, a power-saving button 512, the touch panel controller 516, and the key unit 515, and power is supplied at all times by the internal power source generation unit 202 having received the supply of power source from the power source I/F 201. The power source system 2 includes the LCD controller 523, the LCD touch panel 524, the buzzer 526, and the notification LED 527 and the supply of power source is shut off in the power-saving mode.

The human sensor unit 600 is included in the power source system 1 and receives the supply of power at all times, and therefore, it is possible for the human sensor unit 600 to detect the movement of a person also in the power-saving mode. By the microcontroller 514 periodically receiving a detection signal from a sensor 611 and performing processing on the detection signal, the movement of a person is detected.

The NFC unit 700 includes an NFC LED 711, an NFC power source generation unit 712, and an NFC controller 713. The NFC controller 713 switches between the reader function and the writer function at intervals of hundreds of milliseconds and reads or writes information (data) from or to an NFC compatible device that is held above an antenna unit (not shown). The NFC power source generation unit 712 generates power for the NFC unit 700 to operate. In the case where the image forming apparatus 100 is in the power-saving mode, the generation of power in the NFC power source generation unit 712 is stopped, and therefore, the NFC controller 713 also does not operate.

Subsequently, the transition of the operation mode (power mode) in the image forming apparatus 100 is explained.

Figure 4:
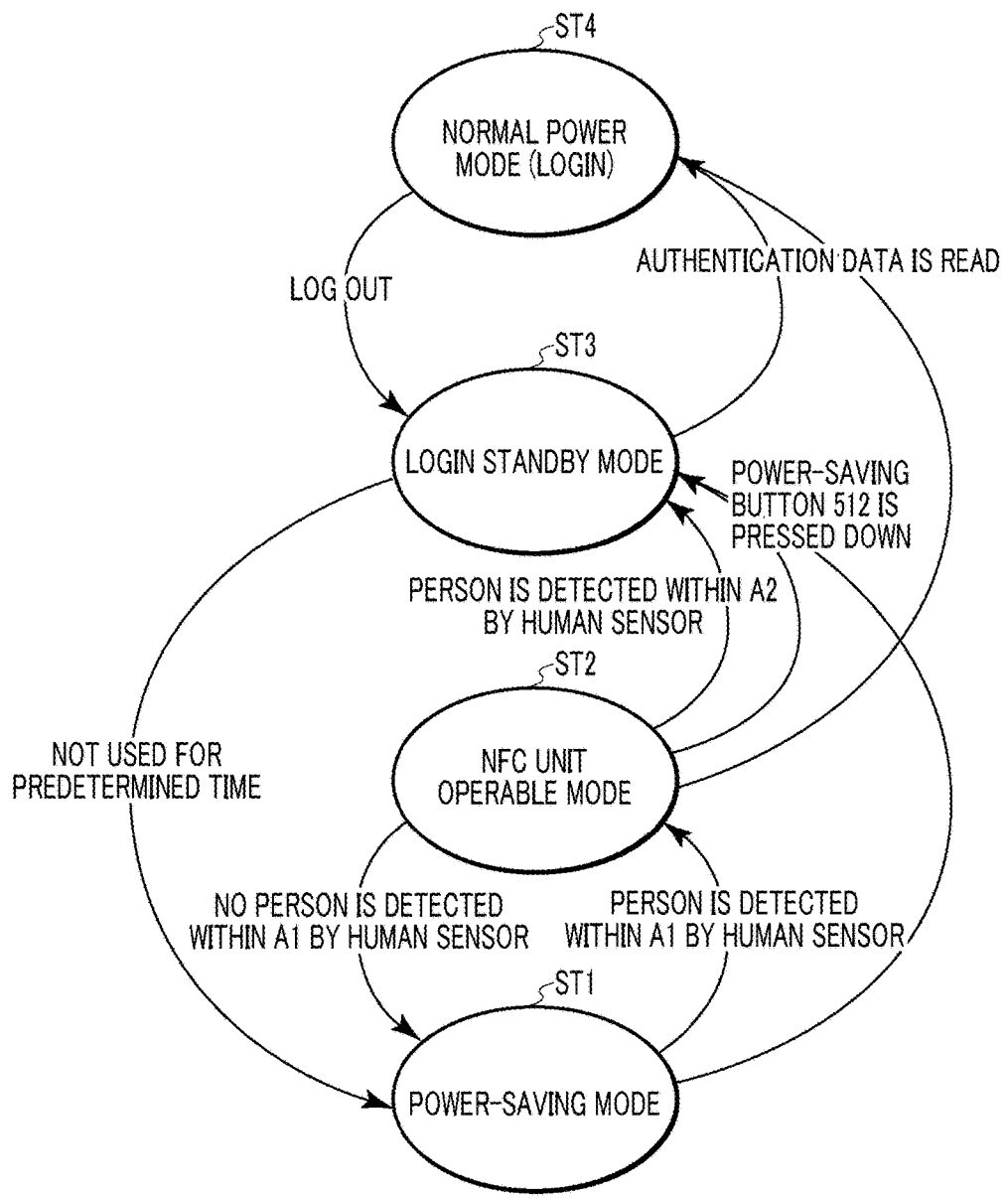
FIG. 4 is a transition diagram of the operation mode of the image forming apparatus according to the first embodiment.
Figure 5B:
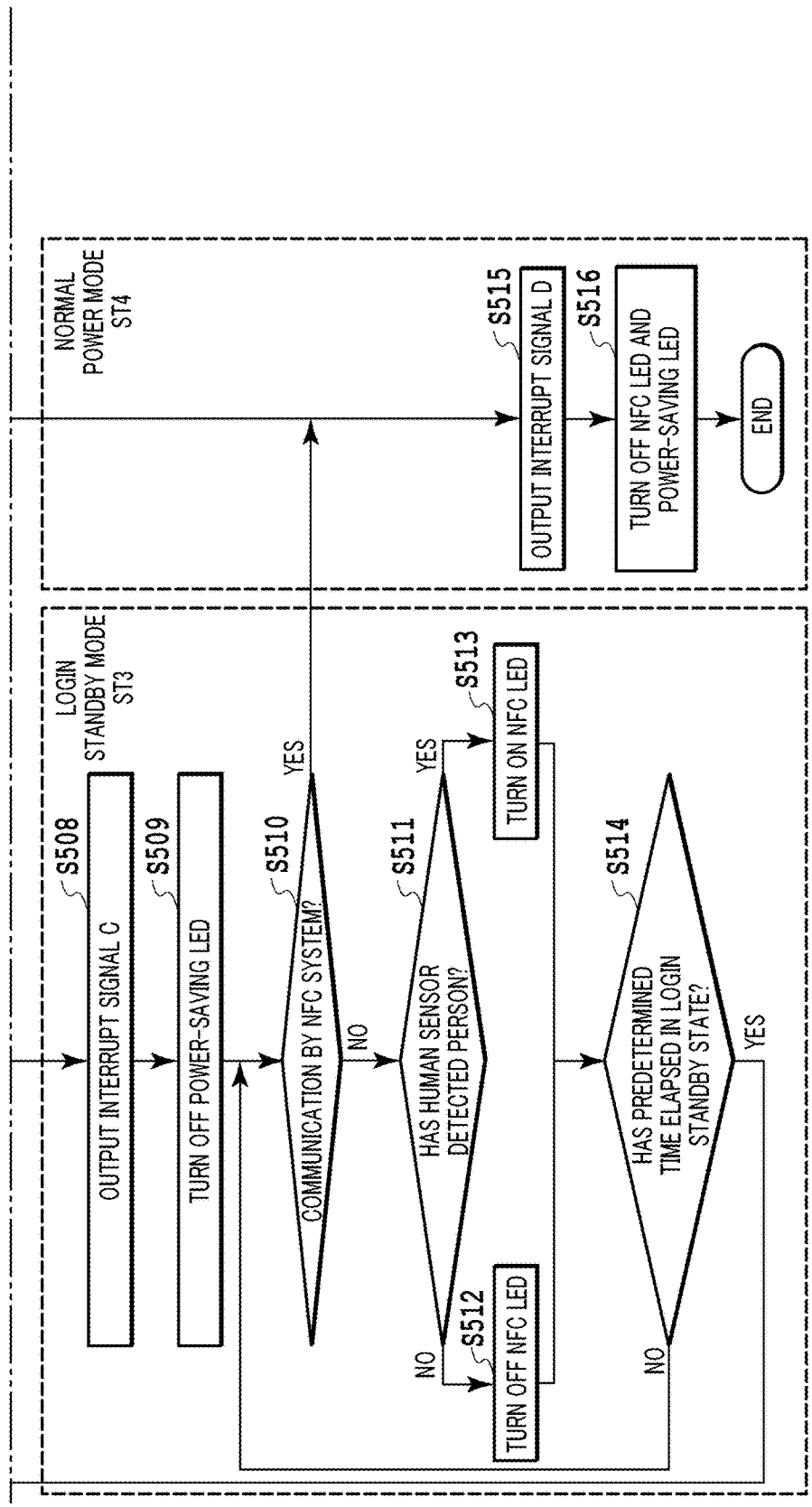

FIG. 4 is a transition diagram of the operation mode of the image forming apparatus 100 according to the present embodiment. The operation mode of the image forming apparatus 100 is roughly divided into a normal power mode (ST4) in which the copy operation or the like can be performed and a power-saving mode (ST1) in which power consumption is lower than that in the normal power mode. Then, between the normal power mode (ST4) and the power-saving mode (ST1), there further exist two operation modes, i.e., an NFC unit operable mode (ST2) and a login standby mode (ST3), as intermediate states. These power modes are controlled by the main controller unit 200 controlling the power source unit 800. In the power-saving mode, the supply of power source to the scanner unit 300, the printer unit 400, etc., is stopped and the power source is supplied only to the inside of the main controller unit 200, the inside of the operation unit 500, and the human sensor unit 600. FIGS. 5A and 5B are flowcharts showing a flow of the control processing of the above-described operation mode in the image forming apparatus 100 according to the present embodiment. In the following, the transition of the operation mode of the image forming apparatus 100 is explained in detail along with the flowcharts in FIGS. 5A and 5B.

Figure 6:
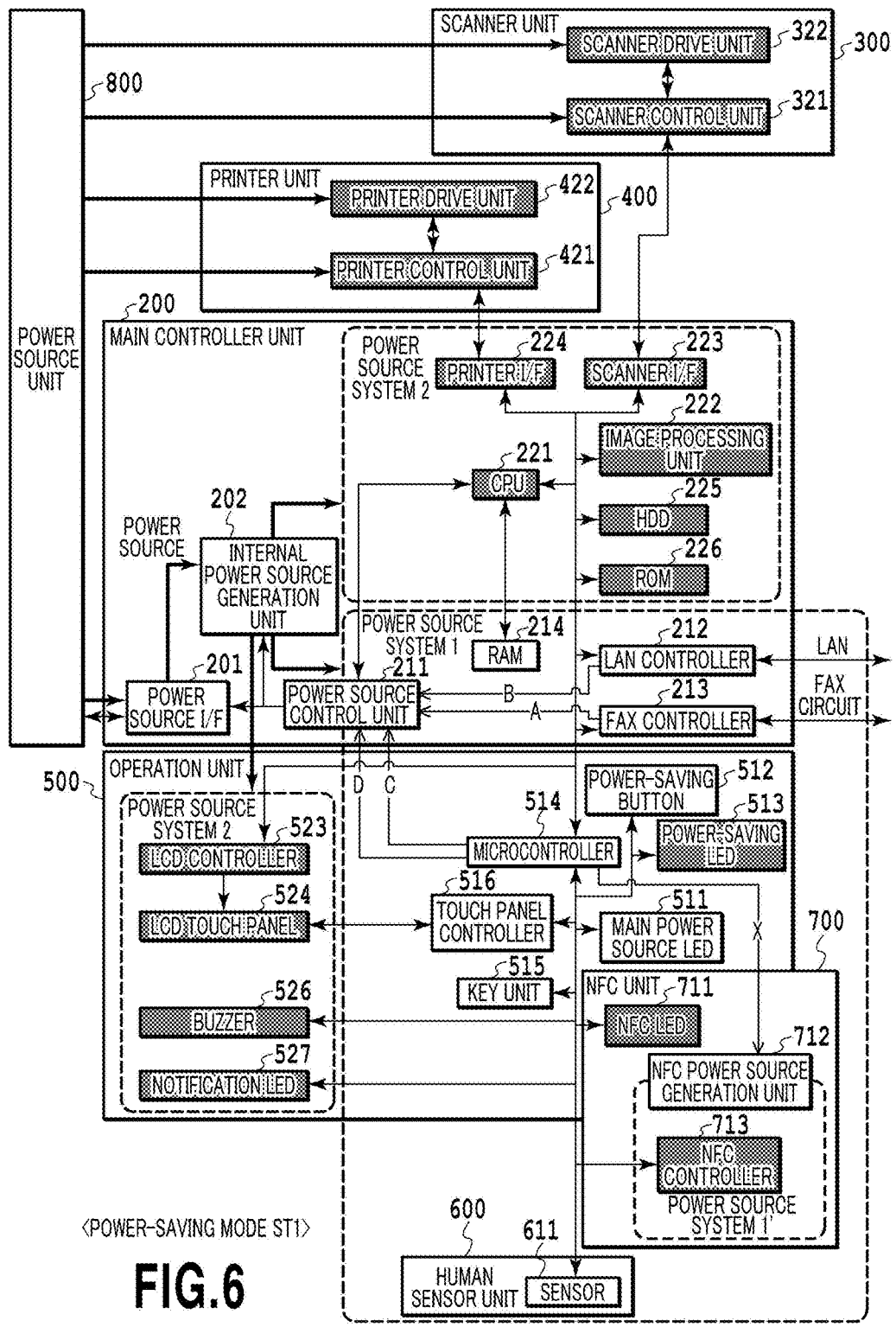
FIG. 6 is a diagram showing a state where power is supplied to each unit constituting the image forming apparatus in a power-saving mode of the first embodiment.

At step 501 in the power-saving mode (ST1), the microcontroller 514 periodically receives the detection signal from the human sensor unit 600 and determines whether a person has been detected within the external detection area A1 or the internal detection area A2. FIG. 6 is a diagram showing a state where power is supplied to each unit constituting the image forming apparatus 100 in the power-saving mode of the present embodiment. In FIG. 6, the gray portion indicates a portion to which the supply of power is stopped. In the case where a person is detected by the human sensor unit 600 in the power-saving mode, the processing proceeds to step 503. In other words, the processing proceeds to the processing to move the mode into the NFC unit operable mode (ST2). On the other hand, in the case where a person is not detected (including the case where a person who has been existing within the external detection area A1 disappears), the processing proceeds to step 502.

At step 502, the microcontroller 514 stops the generation of power source in the case where the power source is generated by the NFC power source generation unit 712. As shown in FIG. 6, in the power-saving mode, power is not supplied to the NFC controller unit 712, and therefore, the NFC unit 700 is in the inoperable state. In order to notify a user of this fact, the NFC LED 711 (and a power-saving LED 513) is brought into the unlit state. Here, the lit state of the NFC LED 711 means a guidance display that shows a user the portion above the apparatus where the user should hold external equipment, such as an NFC compatible device, and the unlit state thereof shows a state where the communication by external equipment, such as an NFC compatible device, cannot be performed. Further, the lit state of the power-saving LED 513 means a guidance display that shows a user the position of the instruction unit, such as a button configured to release the power-saving mode, and the unlit state thereof shows that a user's operation to return the apparatus from the power-saving mode is not necessary.

At step 503, the microcontroller 514 causes the power-saving LED 513 to turn the light on (to blink in the present embodiment) and at the same time, outputs an energization request signal X to the NFC power source generation unit 712. Upon receipt of the energization request signal X, the NFC power source generation unit 712 generates power and starts the supply of power source to the NFC controller 713. Due to this, the NFC unit 700 is brought into the state where the operation (communication by the NFC system) can be performed.

Figure 7:
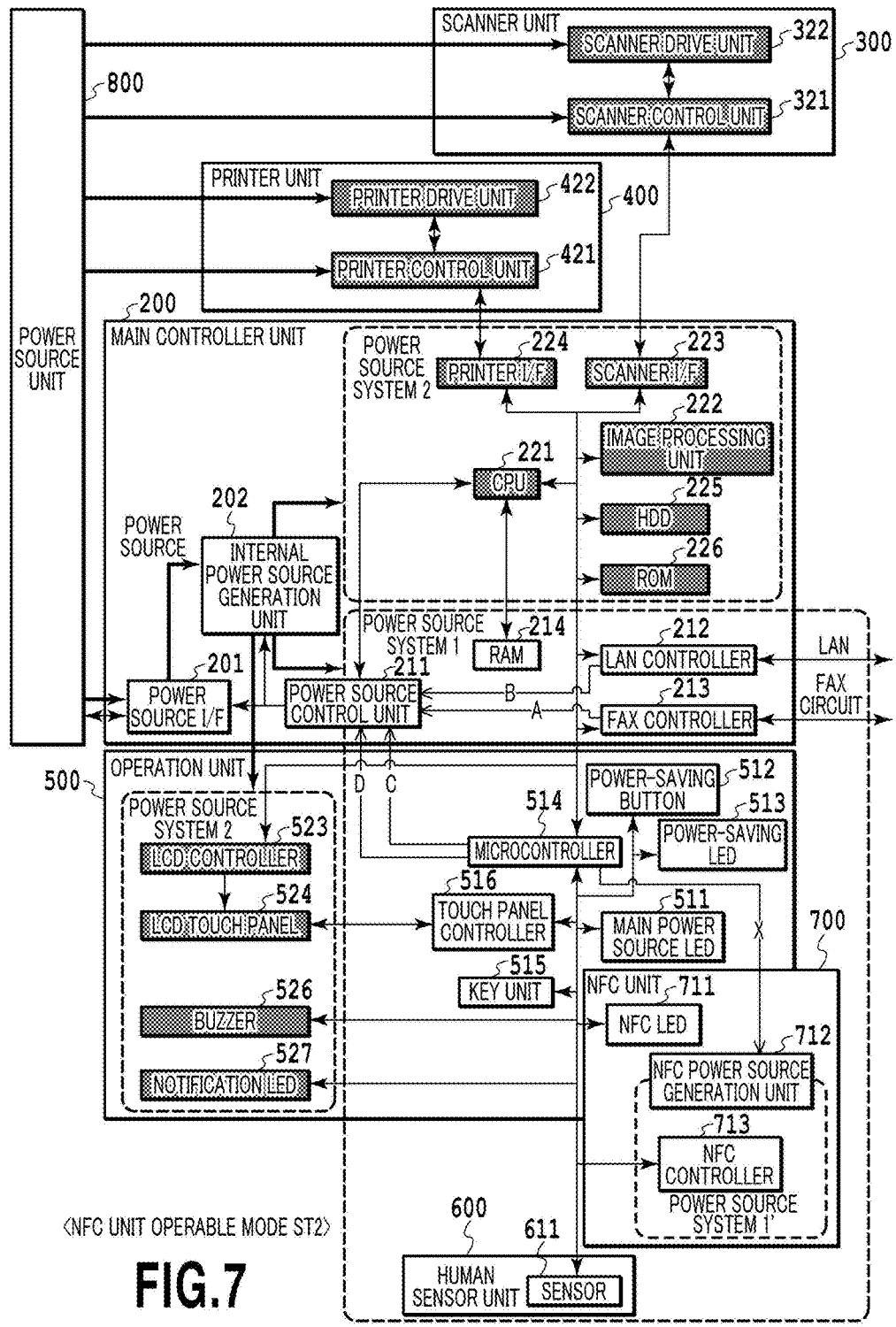
FIG. 7 is a diagram showing a state where power is supplied to each unit constituting the image forming apparatus in an NFC unit operable mode of the first embodiment.

At step 504 that follows, the microcontroller 514 checks that the NFC controller 713 has activated and the NFC unit 700 has become operable, and then causes the NFC LED 711 to turn the light on (to blink in the present embodiment). Due to this, the transition into the NFC unit operable mode (ST2) is completed. FIG. 7 is a diagram showing a state where power is supplied to each unit constituting the image forming apparatus 100 in the NFC unit operable mode of the present embodiment. By a comparison with FIG. 6, it is known that the power-saving LED 513, the NFC LED 711, and the NFC controller 713 are no longer gray, which means that power is supplied thereto in FIG. 7.

At step 505, the microcontroller 514 determines whether the communication by the NFC system has been performed (whether, an NFC compatible device has been held above the NFC unit 700). Here, the fact that the communication by the NFC system has been performed means that, for example, a user's operation for login (user authentication) using an NFC compatible authentication card has been performed. Of course, the user's operation may be performed by using a smart phone in which ID information or the like for user authentication is stored, not limited to an authentication card. In the case where the communication by the NFC system has been performed, the processing proceeds to step 515 and the mode moves into the normal power mode (ST4). On the other hand, in the case where communication by the NFC system has not been performed, the processing proceeds to step 506.

At step 506, the microcontroller 514 determines whether a person has been detected within the range of the internal detection area A2. In the case where a person has been detected within the range of the internal detection area A2, the processing proceeds to step 507. On the other hand, in the case where no person has been detected within the range of the internal detection area A2, the processing returns to step 501.

At step 507, the microcontroller 514 determines whether a predetermined time (e.g., 0.5 sec) has elapsed with the state where a person has been detected within the range of the internal detection area A2 being kept. Here, the predetermined time is arbitrary, and a user or the like may set and hold the predetermined time in advance in the RAM or the like. In the case where the results of the determination indicate that the predetermined time has elapsed with the state where a person has been detected within the range of the internal detection area A2 being kept, the processing proceeds to step 508. On the other hand, in the case where a person is no longer detected within the range of the internal detection area A2 before the predetermined time elapses, the processing returns to step 505. In the present embodiment, in order to simplify the processing flow, after a person is detected within the range of the internal detection area A2, whether the detected state is maintained for the predetermined time is determined. Such determination processing is implemented specifically as follows. First, in the stage where a person has been detected by the human sensor and the processing proceeds to step 503, a variable N used for elapsed time measurement processing is initialized (N=0), and then processing to wait for a predetermined time (e.g., 100 msec) is performed before the determination processing at step 505. Then, in the stage where it is determined that a person has been detected within the range of the internal detection area A2 (Yes at step 506), the variable N is incremented (+1) and subsequently, whether the value of the variable N is equal to or greater than a threshold value (e.g., 5) is determined. In the case where the results of the determination indicate that the value of the variable N is less than the threshold value, the processing returns to the above-described wait processing and the processing is continued. Then, in the stage where the value of the variable N has become equal to or greater than the threshold value, it is sufficient to determine that the predetermined time has elapsed with the state where a person has been detected within the range of the internal detection area A2 being kept.

At step 508, the microcontroller 514 outputs the interrupt signal C to the power source control unit 211. The power source control unit 211 having received the interrupt signal C supplies power to the power source system 2 of the main controller unit 200, the power source system 2 of the operation unit 500, the scanner control unit 321, and the printer control unit 421. The CPU 221 that has activated upon receipt of the supply of power restores the state stored within the RAM 214 and moves the mode from the NFC unit operable mode (ST2) into the login standby mode (ST3). In each of the power-saving mode (ST1) and the NFC unit operable mode (ST2), regardless of the detection of a person by the human sensor unit 600, it is possible to move the mode into the login standby mode (ST3) by outputting the interrupt signal C in accordance with the pressing-down of the power-saving button 512, the touch operation to the LCD touch panel 524, and the pressing-down of the key unit 515.

Figure 8:
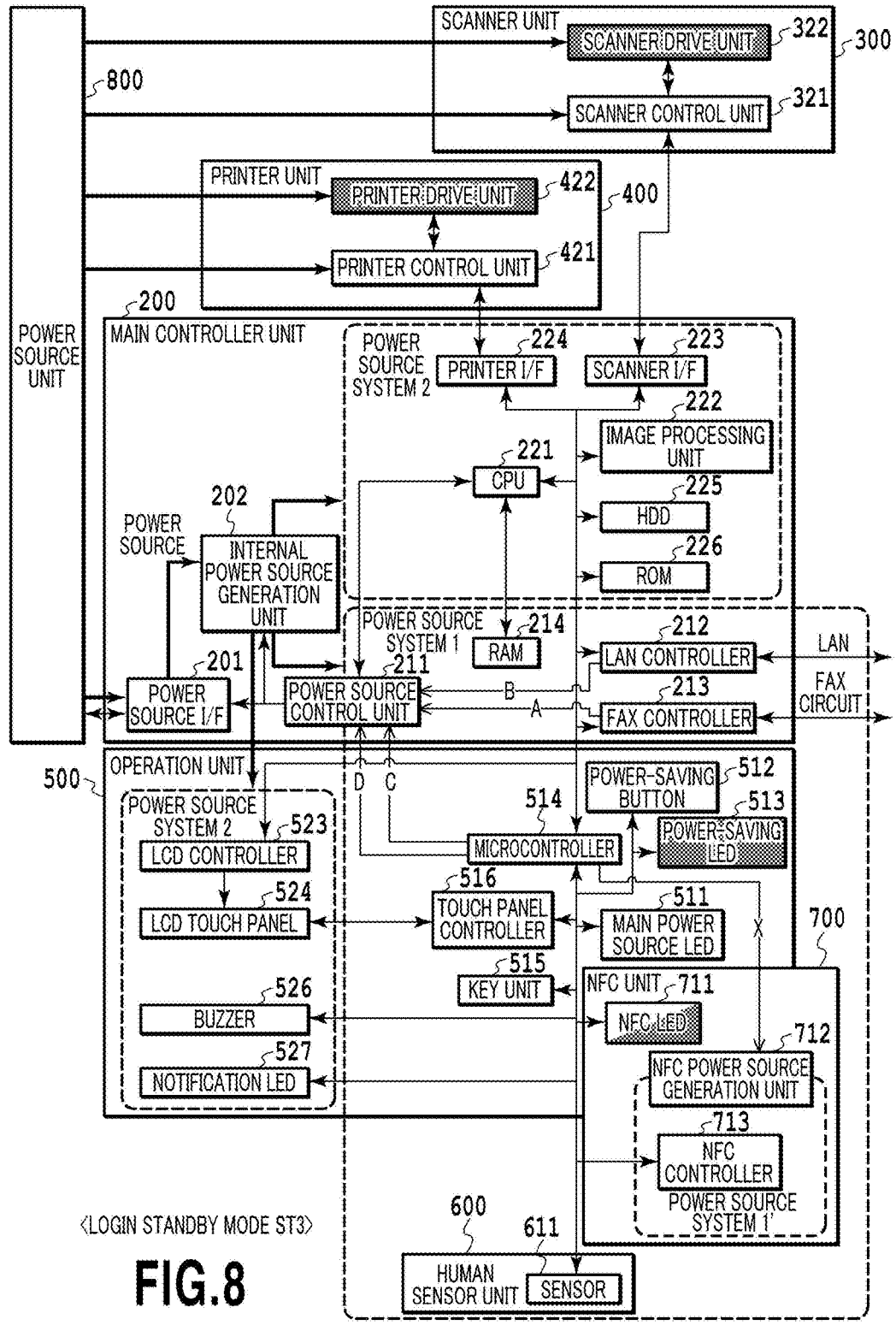
FIG. 8 is a diagram showing a state where power is supplied to each unit constituting the image forming apparatus in a login standby mode of the first embodiment.

At step 509, the microcontroller 514 turns off the power-saving LED 513. In the login standby mode (ST3), the power-saving LED 513 is always in the unlit state. FIG. 8 is a diagram showing a state where power is supplied to each unit constituting the image forming apparatus 100 in the login standby mode of the present embodiment. In FIG. 8, among the portions to which the supply of power is stopped, the power source system 2, the scanner control unit 321 within the scanner unit 300, and the printer control unit 421 within the printer unit 400 are no longer gray, which means that power is supplied thereto in FIG. 8. Half of the NFC LED 711 is shown in gray and this means that the lit state/the unlit state are switched depending on whether a person is detected by the human sensor unit 600.

At step 510, the microcontroller 514 determines whether the communication by the NFC system has been performed (whether an NFC compatible device has been held above the NFC unit 700). In the case where the communication by the NFC system has been performed, the processing proceeds to step 515 and the mode moves into the normal power mode (ST4). On the other hand, in the case where the communication by the NFC system has not been performed, the processing proceeds to step 511. The meaning of the fact that the communication by the NFC is performed is the same as that explained at step 505.

At step 511, the microcontroller 514 determines whether a person has been detected in one of the external detection area A1 and the internal detection area A2 of the human sensor unit 600. This determination processing is the same as that at step 501 described above. In the case where a person has been detected within the external detection area A1 or the internal detection area A2, the processing proceeds to step 513. On the other hand, in the case where no person has been detected, the processing proceeds to step 512.

At step 512, the microcontroller 514 turns off the NFC LED 711.

At step 513, the microcontroller 514 turns on the NFC LED 711 (in the present embodiment, the NFC LED 711 to caused to blink).

At step 514, the microcontroller 514 determines whether a predetermined time (e.g., 30 sec) has elapsed without any operation being performed by a user in the login standby mode. Here, the predetermined time may be arbitrary and a user or the like may set and hold the predetermined time in advance in the RAM or the like. In the case where the results of the determination indicate that the predetermined time has elapsed with the login standby state being kept, the processing returns to step 501. Due to this, the mode will move into the power-saving mode (ST1). On the other hand, in the case where the predetermined time has not elapsed, the processing returns to step 510 and each piece of the processing in the login standby mode is continued. In other words, for the predetermined time after the login standby mode has been entered, the NFC LED 711 is in the lit (blinking) state in the case where there is a person in front of the image forming apparatus 100, and in the unlit state in the case where there is no person. The NFC controller 713 is always in the operable state in the login standby mode. In this manner, a user is notified that the operation to press down the power-saving button 512 is not necessary by the unlit state of the power-saving LED 513 and that the NFC unit 700 is operable by the lit state of the NFC LED 711 in the login standby mode (ST3). In the present embodiment, power is not supplied to the scanner drive unit 322 within the scanner unit 300 and the printer drive unit 422 within the printer unit 400 in the login standby mode (see FIG. 8), and therefore, it is possible to suppress the power consumption of the image forming apparatus 100 until the point in time immediately before the use by a user. As a matter of course, it may also be possible to bring the two drive units described above into the energized state.

In the case where an NFC compatible device is held above the NFC unit 700 (the communication by the NFC system is performed) in one of the NFC unit operable mode (ST2) and the login standby mode (ST3), the microcontroller 514 outputs the interrupt signal D at step 515. The power source control unit 211 having received the interrupt signal D outputs an authentication request notification to the CPU 221 after resuming the supply of power source to the power source system 2 in the case where the supply of power source in the power source system 2 is stopped. Upon receipt of the authentication request notification, the CPU 221 performs user authentication processing and moves the image forming apparatus 100 into the normal power mode (ST4). Although omitted in the present flow, in the case where it is determined that a user is not an authorized user by the user authentication processing, it may be possible to perform processing to, for example, move the mode into (to maintain) the login standby mode (ST3) after displaying a message or the like to that effect on the screen of the operation unit 500.

Figure 9:
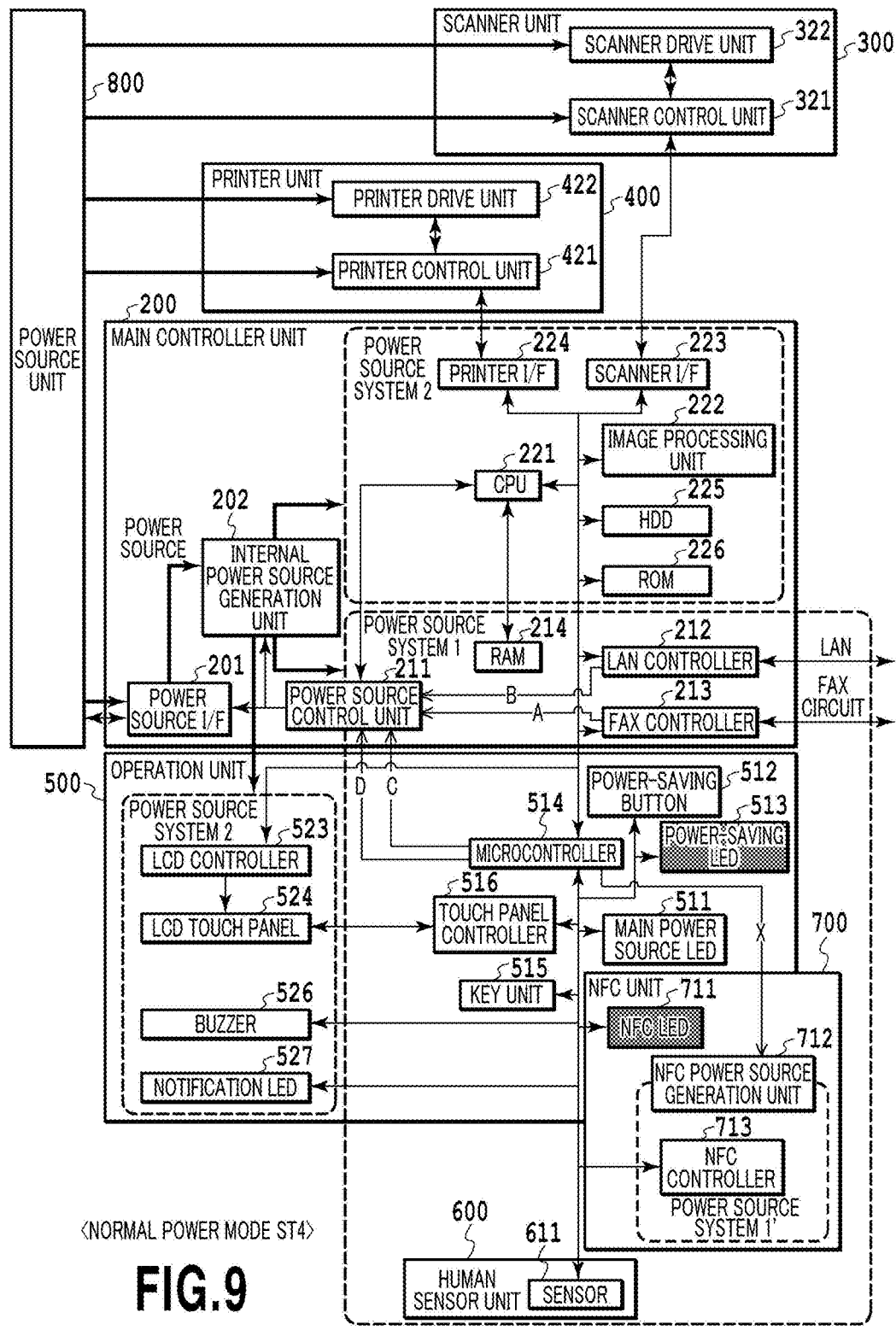
FIG. 9 is a diagram showing a state where power is supplied to each unit constituting the image forming apparatus in a normal power mode of the first embodiment.

At step 516 in the normal power mode (ST4), the microcontroller 514 keeps the NFC LED 711 in the unlit state at all times regardless of whether a person has been detected by the human sensor unit 600. Due to this, it is possible for a user to recognize that login has been completed and that it is not necessary to hold an NFC compatible device (authentication card) for user authentication above the NFC unit 700. FIG. 9 is a diagram showing a state where power is supplied to each unit constituting the image forming apparatus 100 in the normal power mode of the present embodiment. In FIG. 9, only the power-saving LED 513 and the NFC LED 711 are gray, indicating the power stopped state.

Figure 10:
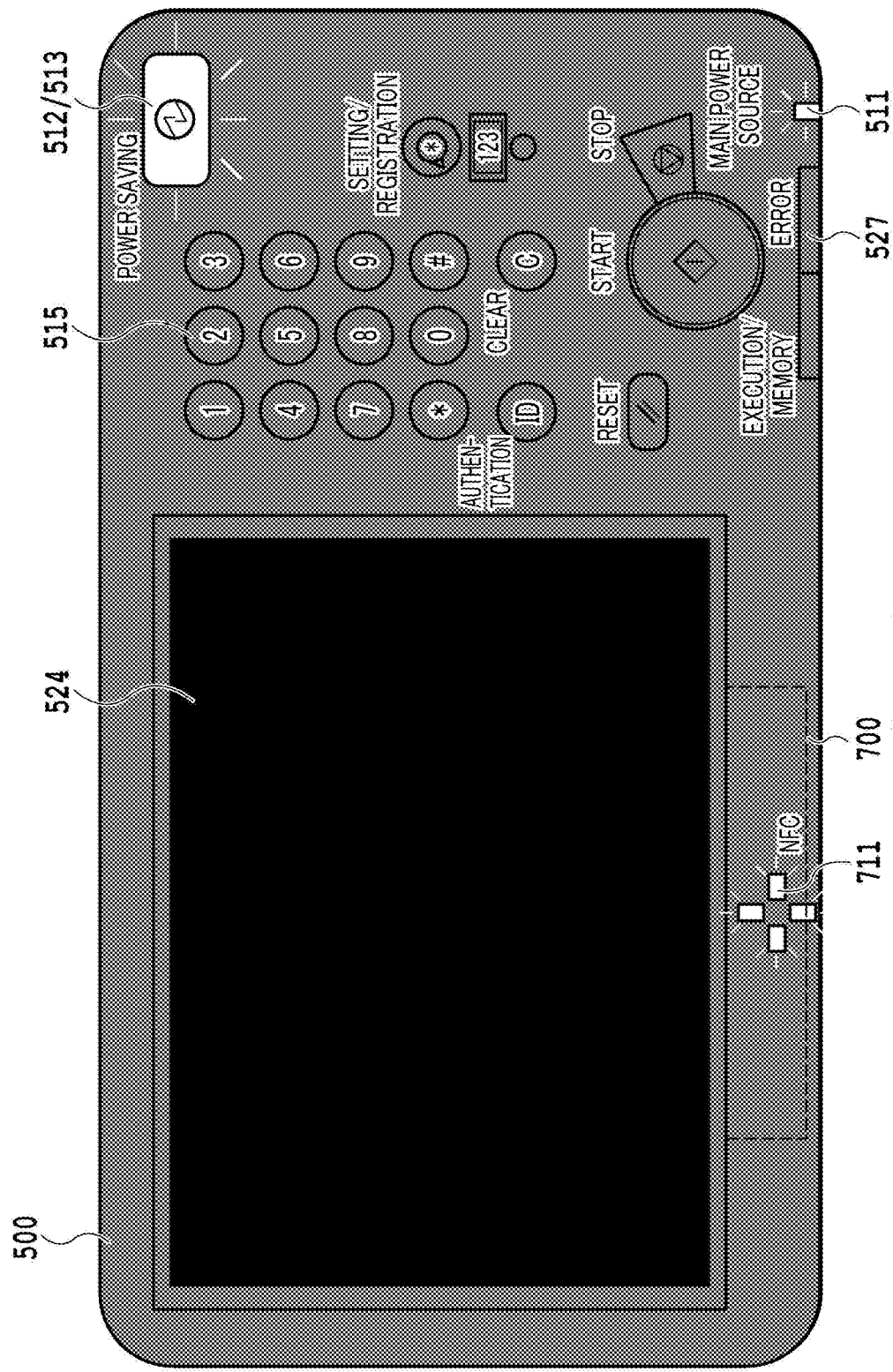
FIG. 10 is a diagram showing an example of an operation unit according to the first embodiment.

FIG. 10 is a diagram showing an example of the operation unit 500 according to the present embodiment. The NFC unit 700 is arranged in front of the operation unit 500 so that it is easy for a user to perform the operation to touch an NFC compatible device to the NFC unit 700. In FIG. 10, the main power source LED 511 is controlled to be in the lit state at all times in the case where the main power source of the image forming apparatus 100 is in the turned-on state. The power-saving LED 513 is arranged under the power-saving button 512 (consisting of, for example, a milky white cover) and in the lit state, it seems that the whole of the power-saving button 512 is in the lit state. The NFC LED 711 is arranged at the center position of the antenna pattern of the NFC unit 700 and the center position of the portion at which the touch operation is performed is indicated as a mark by the cross of the milky white cover. The shape of the NFC LED 711 is required only to be a shape with which a user can recognize the portion at which an NFC compatible device is held above, and the shape may be, for example, a shape of the frame indicating the perimeter of the antenna, in addition to the cross.

FIGS. 11A to 11D are diagrams each showing an example of a guidance display using an LED on the operation unit 500 in each operation mode described above of the image forming apparatus 100 according to the present embodiment.

FIG. 11A shows a display state in the power-saving mode (ST1). The situation is such that there is no person in the external detection area A1 or in the internal detection area A2 of the human sensor unit 600 and only the main power source LED 511 is in the lit state.

FIG. 11B shows a display state in the NFC unit operable mode (ST2). The situation is such that a person has entered the external detection area A1 of the human sensor unit 600 and the power-saving LED 513 and the NFC LED 711 are in the lit (blinking) state. Due to this, there is a guidance effect of guiding the eyesight of a user toward the power-saving button 512 and the NFC unit 700.

FIG. 11C shows a display state in the login standby mode (ST3). The situation is such that a person has entered as far as the internal detection area A2 of the human sensor unit 600 and in this case, the mode automatically returns from the power-saving mode (ST1). Because of this, the power-saving LED 513 is turned off to notify a user that pressing-down of the power-saving button 512 is not necessary. In the example in FIG. 11C, a message screen for notifying a user of the login standby state is also displayed on the screen of the LCD touch panel 524.

FIG. 11D shows a display state in the normal power mode (ST4). The situation is one after a user has held an NFC compatible device above the NFC unit 700 in the NFC unit operable mode (ST2) or in the login standby mode (ST3). Because of the state where each function of the image forming apparatus 100 can be used immediately, and therefore, the NFC LED 711 for guiding the operation to touch the authentication card or the like is turned the light off and a menu screen for a user to select a function to be used is displayed on the LCD touch panel 524.

As above, according to the present embodiment, the LED corresponding to the NFC reader/writer on the apparatus lights up (blinks) in accordance with the operation mode (power mode) of the apparatus and the situation detected by the human sensor. Due to this, it is possible for a user to accurately know the position on the apparatus where the operation to touch an NFC compatible device for login should be performed and whether or not the state is one where the communication by the NFC system can be performed.

Then, by returning the mode from the power-saving mode by giving priority to the NFC reader/writer in response to the human sensor, it is made possible for a user to smoothly perform the operation to touch an NFC compatible device without the need to wait for the return of the apparatus (return to the normal power mode).

Further, it is possible for a user to grasp that he/she does not need to perform the operation to return the mode by him/herself, such as the operation to press down the power-saving button, by turning off the LED corresponding to the power-saving button to notify the user that the power-saving mode is released.

Further, in the case where a user does not exist within a fixed range of the image forming apparatus, it is possible to detect it by the human sensor and to suppress the production of an unnecessary guidance display even in the state where the communication by the NFC system can be performed.

Second Embodiment

Next, an aspect is explained as a second embodiment in which an operation mode to transmit and receive data in conjunction with an NFC compatible device after login to the image forming apparatus is added. Explanation of the portions in common to those of the first embodiment is omitted or simplified and in the following, different points are explained mainly.

Figure 12:
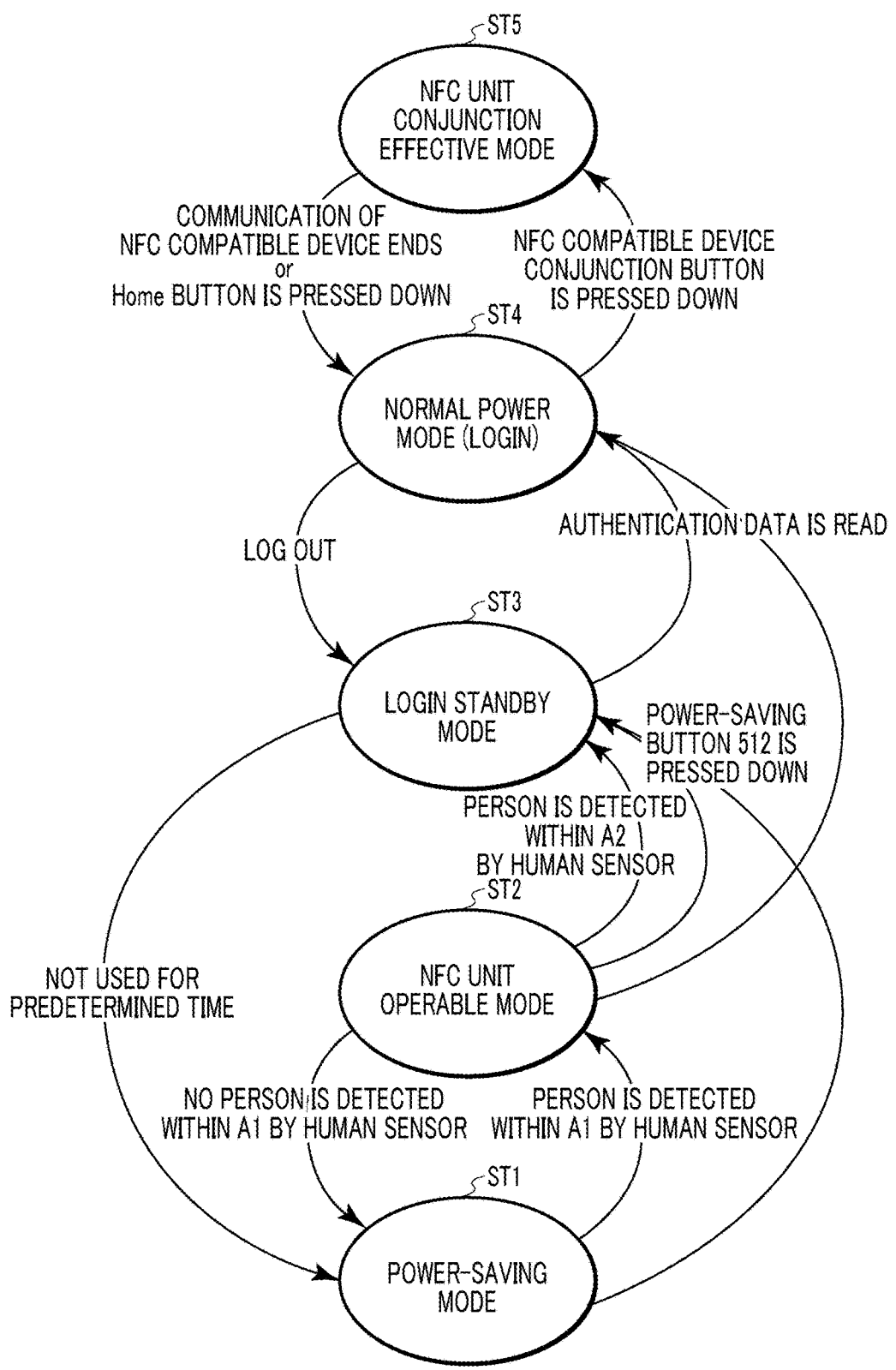
FIG. 12 is a transition diagram of the operation mode of an image forming apparatus according to a second embodiment.

FIG. 12 is a transition diagram of the operation mode of the image forming apparatus 100 according to the present embodiment. By a comparison with FIG. 4, which is the state transition diagram of the first embodiment, an NFC unit conjunction effective mode (ST5) is added newly. The NFC unit conjunction effective mode (ST5) is an operation mode in which data communication can be performed based on the communication standard, such as Bluetooth (registered trademark) and Wi-Fi, by performing pairing between an NFC compatible device, such as a smart phone, and the image forming apparatus 100 after login is completed.

Figure 14:
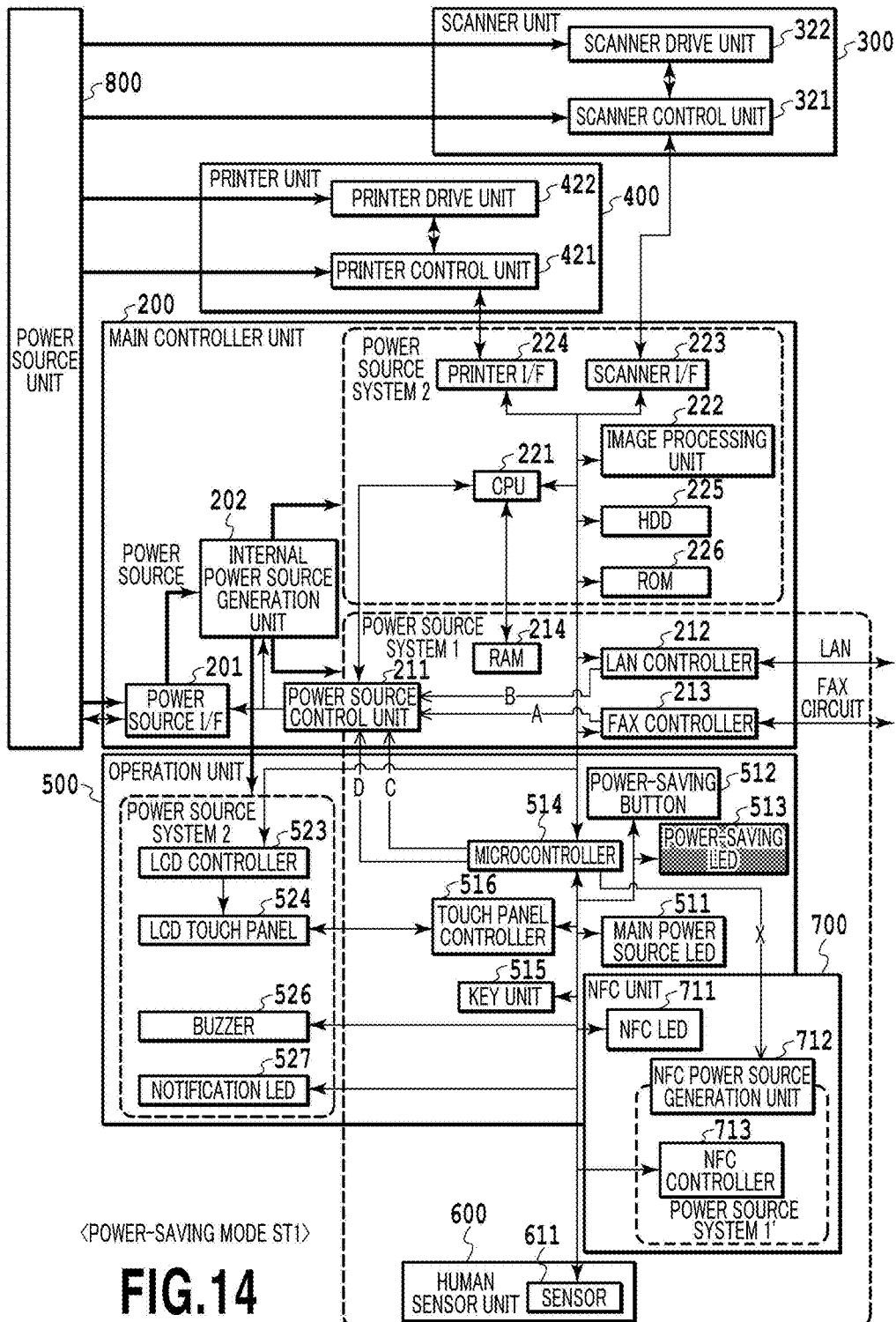
FIG. 14 is a diagram showing a state where power is supplied to each unit constituting the image forming apparatus in an NFC unit conjunction effective mode of the second embodiment.

FIGS. 13A and 13B are diagrams each showing an example of a guidance display using an LED on the operation unit 500 in the normal power mode and in the NFC unit conjunction effective mode according to the present embodiment. FIG. 13A is a diagram showing a display state in the normal power mode (ST4) of the present embodiment and a "HELP button" portion in FIG. 11D of the first embodiment is changed into an "NFC COMPATIBLE DEVICE CONJUNCTION button 530". The NFC COMPATIBLE DEVICE CONJUNCTION button 530 is a button for moving the state into the operation state where data communication can be performed by performing paring between the image forming apparatus 100 and an NFC compatible device. FIG. 13B is a diagram showing a display state in the NFC unit conjunction effective mode (ST5). In the case where the above-described NFC COMPATIBLE DEVICE CONJUNCTION button 530 (see FIG. 13A) is pressed down in the normal power mode, the mode makes a transition into the NFC unit conjunction effective mode (ST5). FIG. 14 is a diagram showing a state where power is supplied to each unit constituting the image forming apparatus 100 in the NFC unit conjunction effective mode of the present embodiment. In FIG. 14, only the power-saving mode LED 513 is shown in gray and it is known that the LED 711 is in the state where power is being supplied. In other words, in the NFC unit conjunction effective mode (ST5), the NFC LED 711 is always in the lit (blinking) state regardless of the detection results of the human sensor unit 600. Due to this, a user is notified of the portion where the operation to touch an NFC compatible device, such as a smart phone, is performed. Then, in the NFC unit conjunction effective mode, in the case where the data communication with an NFC compatible device ends or a Home button 531 (see FIG. 13B) is pressed down, the mode returns to the normal operation mode (ST4) and the NFC LED 711 is turned off again. Except for those points explained above, the contents of the transition control of the operation mode are the same as those of the first embodiment.

As above, in the present embodiment, in the operation mode in which data communication is performed between an NFC compatible device and the image forming apparatus by the communication by the NFC system, the LED corresponding to the NFC reader/writer is caused to turn the light on (blink). Due to this, it is possible to accurately notify a user of the position where the operation to touch the NFC compatible device for pairing is performed.

Third Embodiment

Subsequently, an aspect is explained as a third embodiment in which the image forming apparatus separately includes a card reader for an authentication card not compatible with the NFC. Explanation of the portions in common to those of the first and second embodiments is omitted or simplified and in the following, different points are explained mainly.

Figure 15:
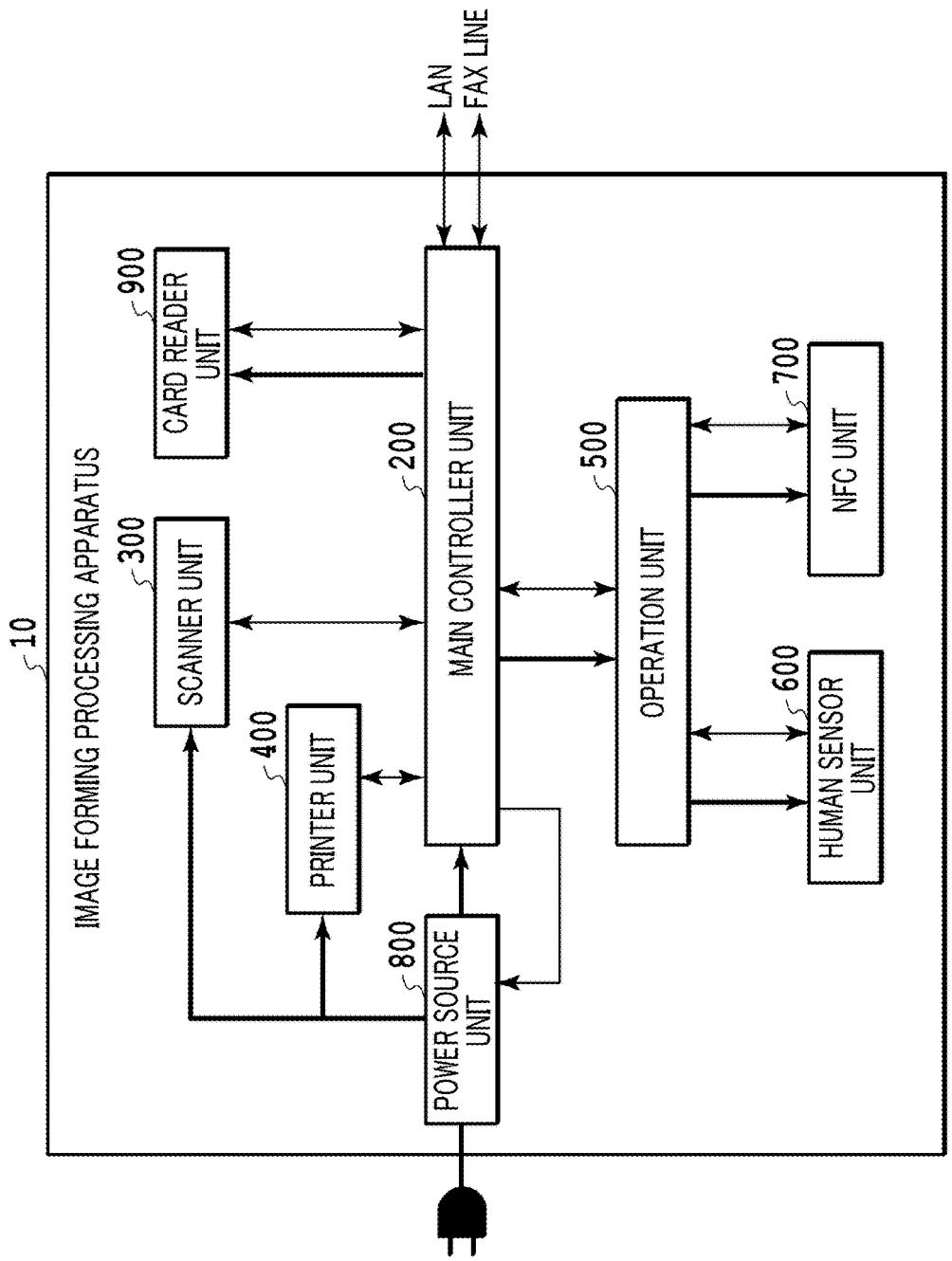
FIG. 15 is a simplified function block diagram of an image forming apparatus according to a third embodiment.
Figure 16:
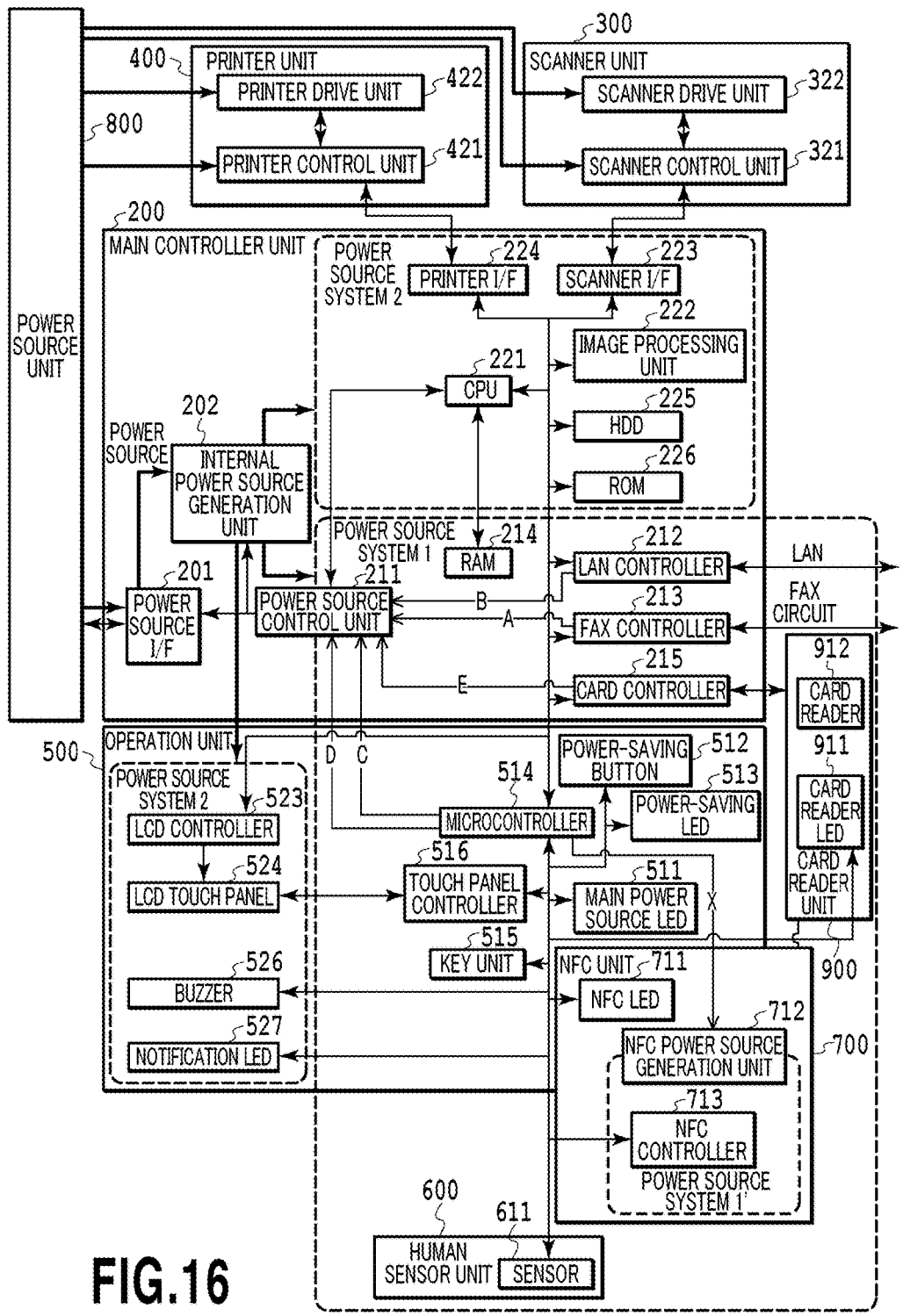
FIG. 16 is a block diagram showing details of each component (function unit) of the image forming apparatus according to the third embodiment.

FIG. 15 is a simplified function block diagram of the image forming apparatus 100 according to the present embodiment. The image forming apparatus 100 includes the main controller unit 200, the scanner unit 300, the printer unit 400, the operation unit 500, the human sensor unit 600, the NFC unit 700, the power source unit 800, and a card reader unit 900. FIG. 16 is a block diagram showing details of each component (function unit) shown in FIG. 15.

The third embodiment differs from the first embodiment in that the dedicated card reader unit 900 for reading an authentication card not compatible with the NFC (compatible with a wireless communication system other than the NFC system) is added and in that the connections related to the card reader unit 900 are added. Specifically, a card controller 215 is provided inside the main controller unit 200 and the card controller 215 is connected with a card reader 912 within the card reader unit 900.

The card reader unit 900 includes the card reader 912 and a card reader LED 911. The lit (blinking) state/the unlit state of the card reader LED 911 is controlled by the microcontroller 514 of the operation unit 500.

Figure 17:
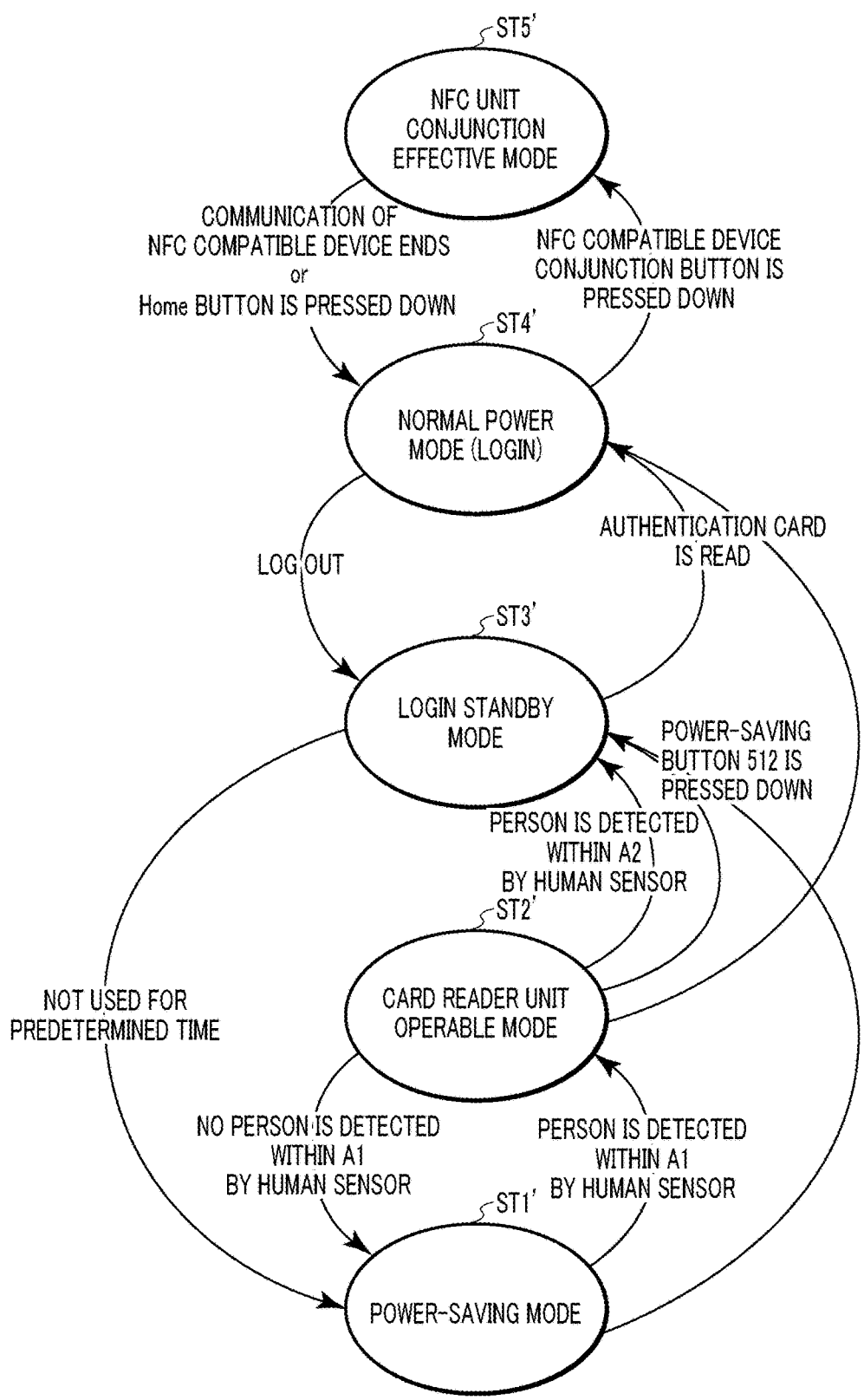
FIG. 17 is a transition diagram of the operation mode of the image forming apparatus according to the third embodiment.

FIG. 17 is a transition diagram of the operation mode of the image forming apparatus 100 according to the present embodiment. As the operation mode in the present embodiment, there exist a power-saving mode (ST1'), a card reader unit operable mode (ST2'), a login standby mode (ST3'), a normal power mode (ST4'), and an NFC unit conjunction effective mode (ST5'). FIG. 18 to FIG. 22 are diagrams each showing a state where power is supplied to each unit constituting the image forming apparatus 100 in each operation mode in the present embodiment. In the following, explanation is given in order.

Figure 18:
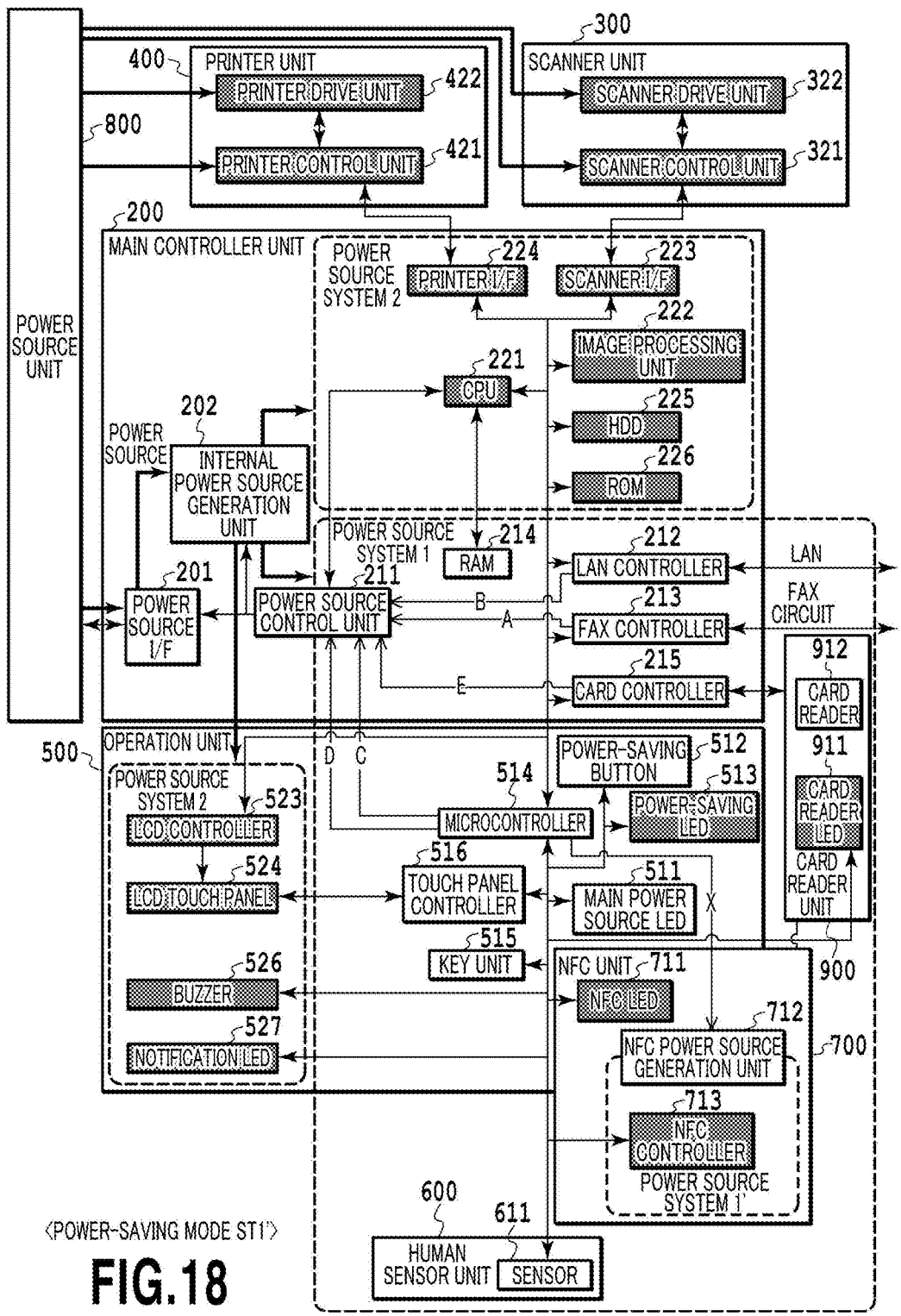
FIG. 18 is a diagram showing a state where power is supplied to each unit constituting the image forming apparatus in a power-saving mode of the third embodiment.

In the power-saving mode (ST1'), as shown in FIG. 18, the NFC unit 700 is in the inoperable state (the NFC LED 711 is in the unlit state), but the card reader 912 and the card controller 215 are in the energized state and in the state where the operation to recognize a card can be performed. This mode supposes a case as an example where a user tries to log in by stretching his/her hand from a blind spot, such as a position outside the detection area of the human sensor unit 600, to hold an authentication card above. However, in order to suppress power consumption, the card recognition operation is performed, for example, at two-second intervals. The microcontroller 514 periodically receives the detection signal from the human sensor unit 600 and on detecting that a person has entered the external detection area A1 or the internal detection area A2, the microcontroller 514 causes the power-saving LED 513 and the card reader LED 911 to turn the light on (blink) and moves the mode into the card reader unit operable mode (ST2').

Figure 19:
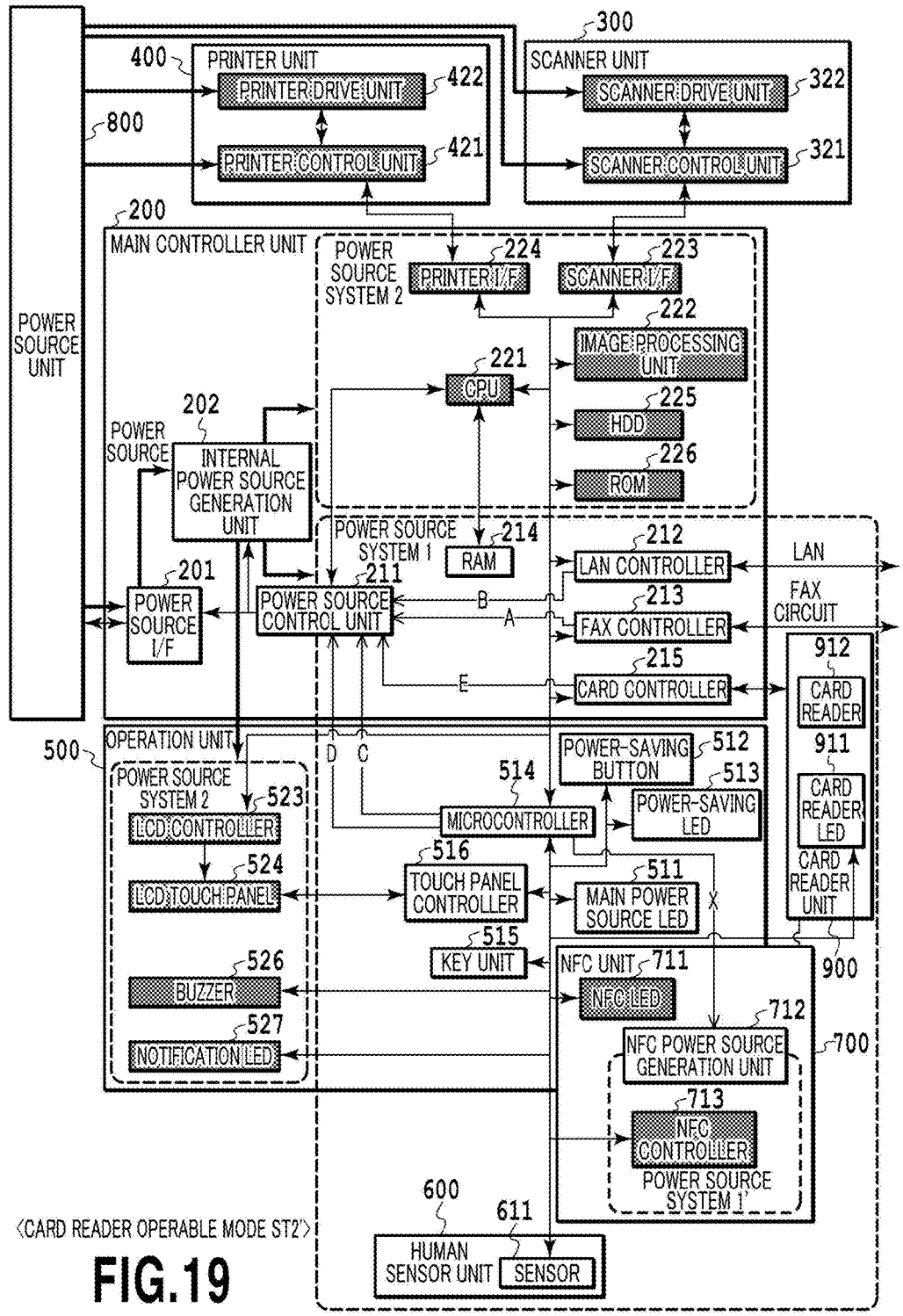
FIG. 19 is a diagram showing a state where power is supplied to each unit constituting the image forming apparatus in a card reader operable mode of the third embodiment.

In the card reader unit operable mode (ST2'), as shown in FIG. 19, the microcontroller 514 causes the power-saving LED 513 and the card reader LED 911 to (blink). Further, the microcontroller 514 instructs the card controller 215 to shorten the authentication card recognition interval (e.g., to 100 msec). Upon receipt of the instructions, the card controller 215 performs the card recognition operation at predetermined short intervals to increase the response speed of card recognition. Then, after a person disappears from the sensor detection area A1, the microcontroller 514 terminates the lit (blinking) state of the power-saving LED 513 and the card reader LED 911. On the other hand, in the case of detecting a state where a person has entered as far as the internal detection area A2 during a predetermined period of time, the microcontroller 514 outputs the interrupt signal C to the power source control unit 211. Upon receipt of the interrupt signal C, the power source control unit 211 supplies power to the power source system 2 of the main controller unit 200, the power source system 2 of the operation unit 500, the scanner control unit 321, and the printer control unit 421. Then, the CPU 221 having received the supply of power and activated restores the state stored within the RAM 214 and moves the mode into the login standby mode (ST3').

Figure 20:
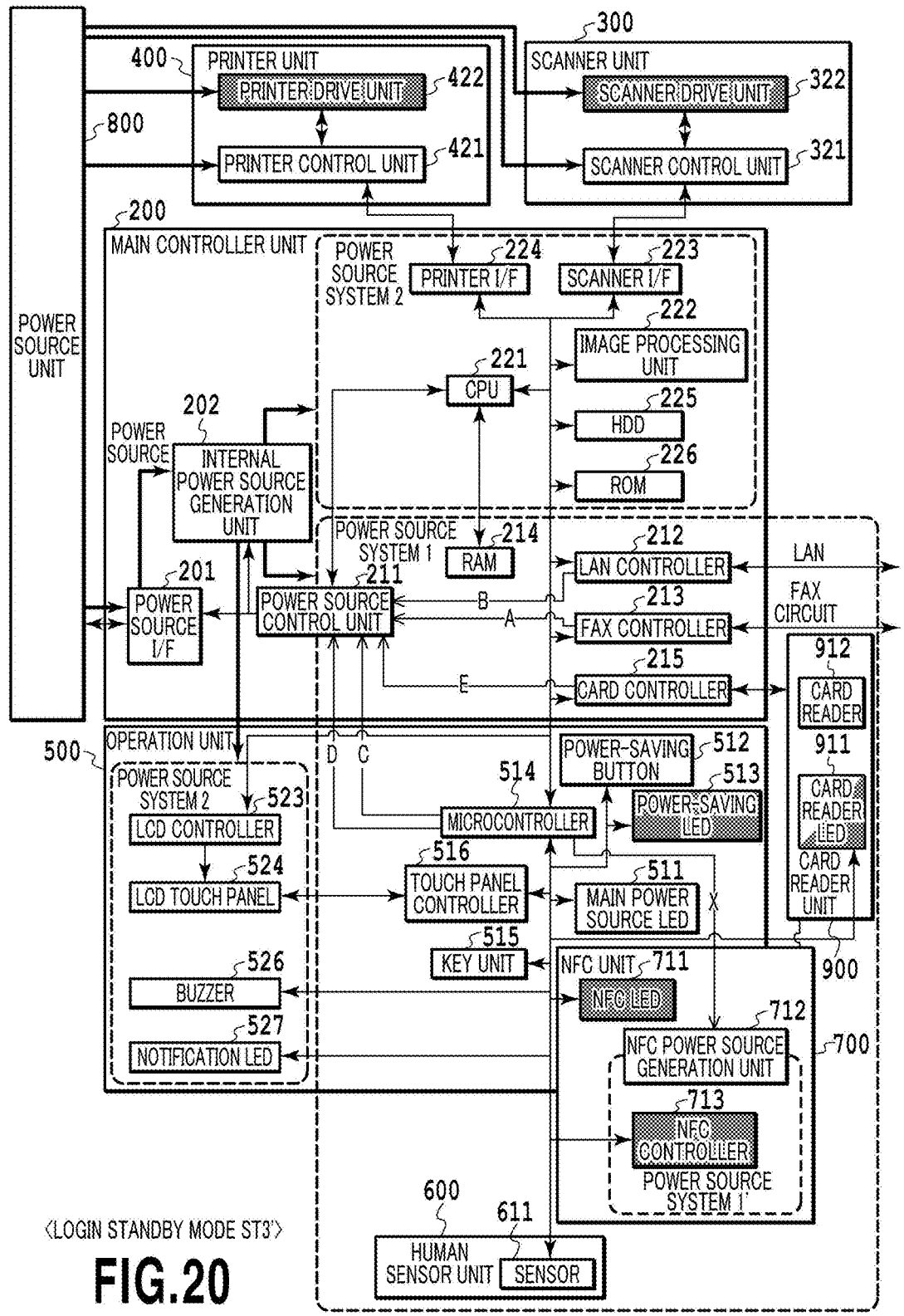
FIG. 20 is a diagram showing a state where power is supplied to each unit constituting the image forming apparatus in a login standby mode of the third embodiment.

In the login standby mode (ST3'), as shown in FIG. 20, the power-saving LED 513 is always in the unlit state. However, the card reader LED 911 is in the lit (blinking) state in the case where a person has been detected by the human sensor unit 600 and in the unlit state where no person has been detected. Due to this, it is possible to notify a user that the operation to press down the power-saving button 512 is not necessary and that the card reader unit 900 is operable.

Figure 21:
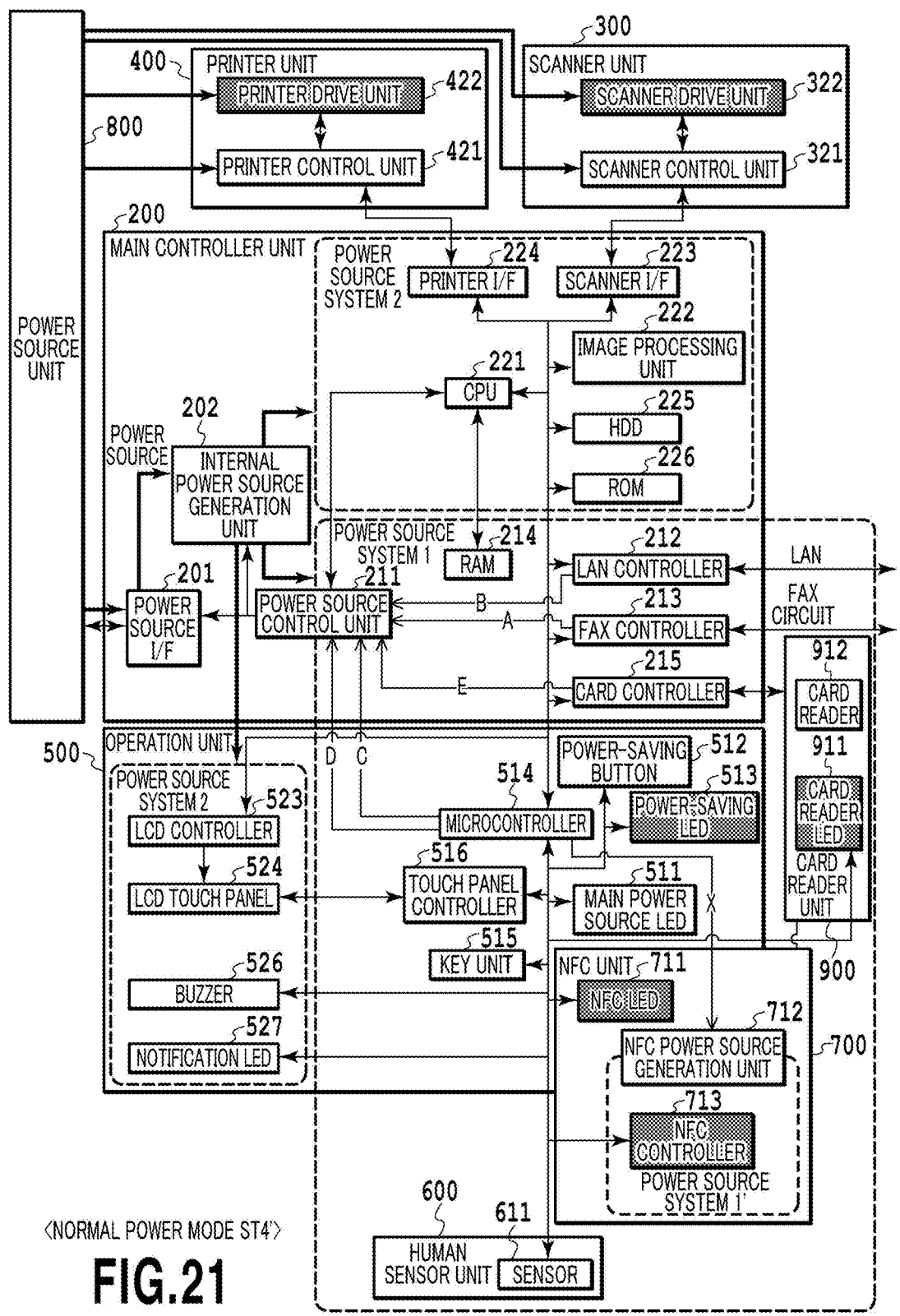
FIG. 21 is a diagram showing a state where power is supplied to each unit constituting the image forming apparatus in a normal power mode of the third embodiment.

In the case where a login authentication card is held above the card reader 912 in one of the card reader unit operable mode (ST2') and the login standby mode (ST3'), the card controller 215 outputs the interrupt signal E to the power source control unit 211 (see FIG. 21). Upon receipt of the interrupt signal E, the power source control unit 211 starts the supply of power to the power source system 2 in the case where the supply of power is stopped and sends an authentication request signal to the CPU 221. Upon receipt of the authentication request signal, the CPU 221 performs user authentication processing. After the user authentication is completed, the mode moves into the normal power mode (ST4').

In the normal power mode (ST4'), as shown in FIG. 21, the card reader LED 911 is always in the unlit state regardless of whether or not a person is detected by the human sensor unit 600. Due to this, it is possible for a user to recognize that it is no longer necessary to hold the authentication card above the card reader unit 900. In the normal power mode (ST4'), in the case where the NFC COMPAT- IBLE DEVICE CONJUNCTION button 530 displayed on the LCD touch panel 524 of the operation unit 500 is pressed down, the mode makes a transition into the NFC unit conjunction effective mode (ST5').

In the NFC unit conjunction effective mode (ST5'), as shown in FIG. 22, the NFC controller 713 is energized and becomes operable and the NFC LED 711 enters the lit (blinking) state. Due to this, a user is notified of the position where the operation to touch an NFC compatible device, such as a smart phone, is performed for pairing. In the NFC unit conjunction effective mode (ST5'), the NFC LED 711 is always in the lit (blinking) state regardless of whether or not a person is detected by the human sensor unit 600.

FIGS. 23A to 23E are diagrams each showing an example of a guidance display using an LED on the operation unit 500 in each operation mode described above of the image forming apparatus 100 according to the present embodiment.

Figure 23A:
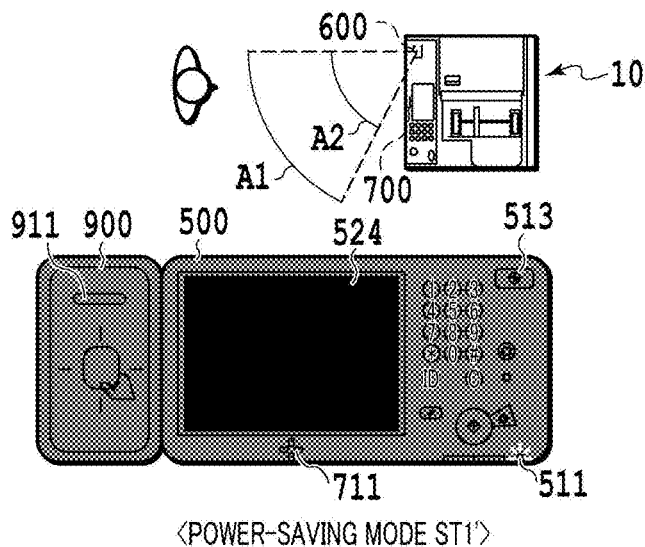
FIGS. 23A to 23E are diagrams each showing an example of a guidance display using an LED on an operation unit according to the third embodiment.

FIG. 23A shows a display state in the power-saving mode (ST1') and only the main power source LED 511 is in the lit state. In this situation, in the case where a person enters the external detection area A1 or the internal detection area A2 of the human sensor unit 600, the mode moves into the card reader unit operable mode (ST2').

Figure 23B:
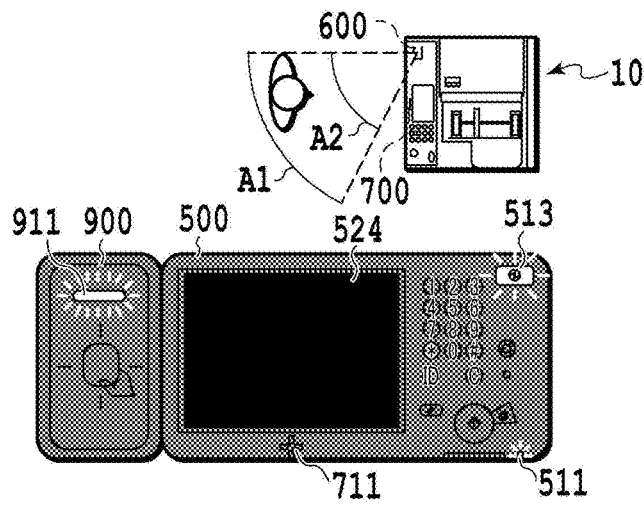

FIG. 23B shows a display state in the card reader unit operable mode (ST2') and the power-saving LED 513 and the card reader LED 911 are in the lit (blinking) state. Due to this, a user is notified of the position of the card reader unit 900 and that the card reader unit 900 can perform communication. In this situation, in the case where a person comes close to the internal detection area A2 and a predetermined time elapses with this state being kept, the mode moves into the login standby mode (ST3').

Figure 23C:
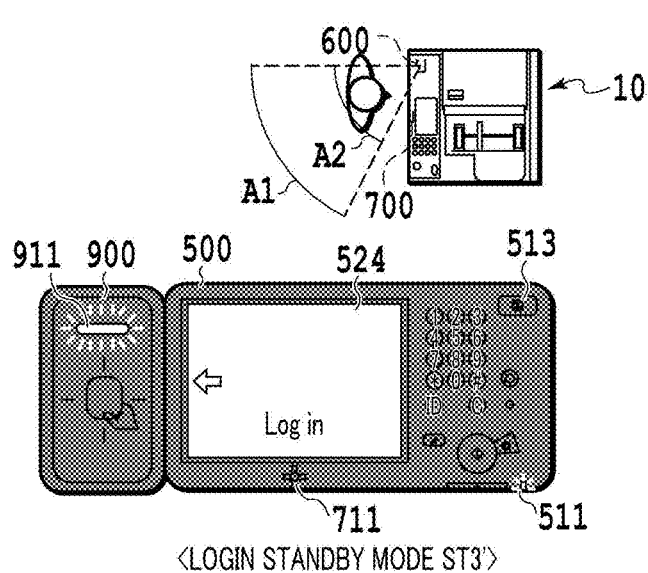

FIG. 23C shows a display state in the login standby mode (ST3'). The login standby mode is a mode close to the normal power state and it is not necessary to press down the power-saving SW 512, and therefore, the power-saving LED 513 is the unlit state.

Figure 23D:
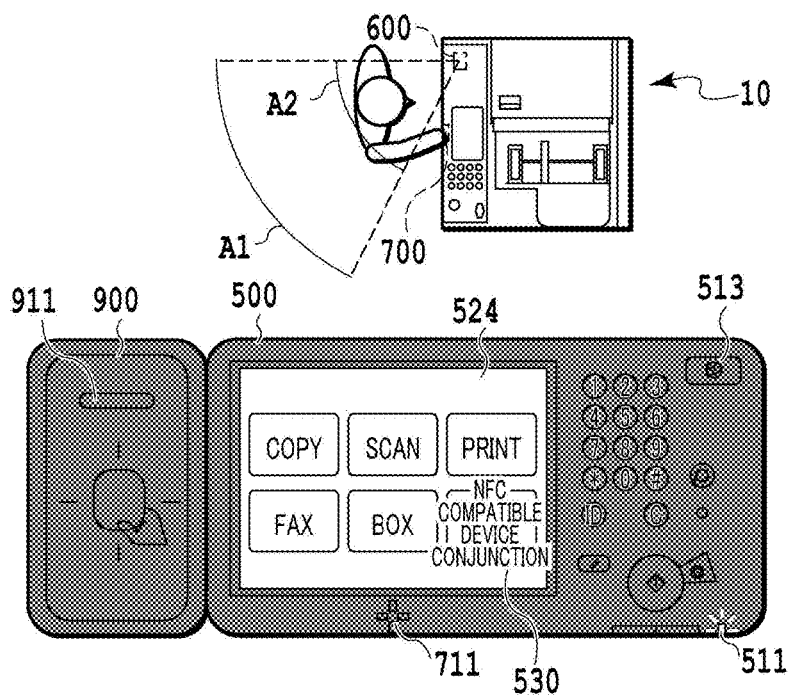

FIG. 23D shows a display state in the normal power mode (ST4'). In the card reader unit operable mode (ST2') or in the login standby mode (ST3'), in the case where the operation to touch an authentication card to the card reader unit 900 is performed, user authentication processing is performed and the mode moves into the normal power mode (ST4'). In the normal power mode (ST4'), the card reader LED 911 is in the unlit state. Due to this, it is possible for a user to grasp that the operation to hold an authentication card above is no longer necessary. In this situation, in the case where the NFC COMPATIBLE DEVICE CONJUNCTION button 530 is pressed down, the mode moves into the NFC unit conjunction effective mode (ST5').

Figure 23E:
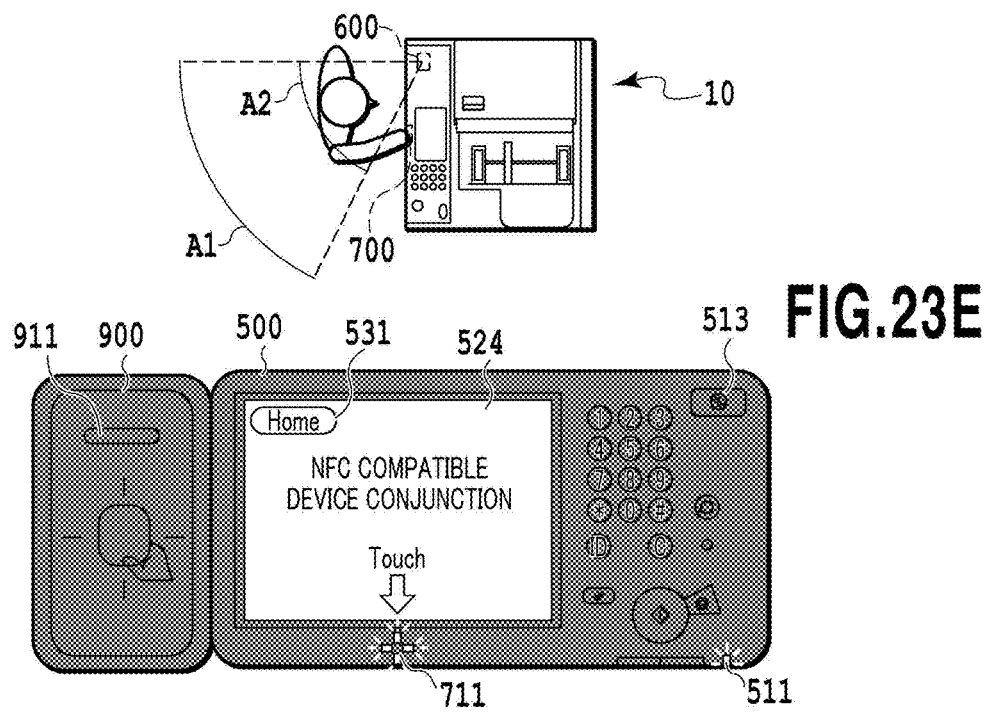

FIG. 23E shows a display state in the NFC unit conjunction effective mode (ST5'). In the NFC unit conjunction effective mode (ST5'), the NFC LED 711 is in the lit (blinking) state. Due to this, a user is notified of the position where an NFC compatible device, such as a smart phone, is held above and that the communication by the NFC system can be performed.

As above, according to the present embodiment, by lighting up the card reader LED 911 and the NFC LED 711 in accordance with situations, it is possible to notify a user of the position where the operation to touch an authentication card not compatible with the NFC or an NFC compatible device is performed and of whether or not they are in the state where communication can be performed. Then, in an image forming apparatus in which a plurality of portions exists where the operation to touch an authentication card not compatible with the NFC or an NFC compatible device is required, it is also possible to accurately notify a user of the position of the touch operation and of whether or not the touch operation is necessary.

Further, at the time of transition from the power-saving mode, by bringing about a state where the recognition interval of a card reader is shortened in response to the human sensor and communication can be performed preferentially, it is made possible for a user to perform the operation to touch an authentication card without the need to wait for the return of the apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an apparatus capable of automatically returning from a power-saving mode in response to a human sensor and including a wireless communication function with external equipment, it is possible to notify a user of the position on the apparatus where the user should perform the operation to touch the external equipment and of whether or not the above-described communication can be performed in an easy-to-understand manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-230849, filed Nov. 13, 2014 which is hereby incorporated by reference wherein in its entirety.

What is claimed is:

1. An apparatus including a plurality of operation modes, the plurality of operation modes including at least a normal power mode and a power-saving mode in which power consumption is lower than that in the normal power mode, the apparatus comprising:

a human sensor configured to detect a person who exists within a predetermined range of the apparatus, the predetermined range including a first range and a second range closer to the apparatus than the first range as detection ranges;

communication equipment configured to wirelessly communicate with external equipment that is held above the apparatus;

first light-emitting equipment configured to be lit to provide light at a position where the external equipment is to be held above the apparatus;

second light-emitting equipment configured to be lit to provide light at a position where a user instruction to return the apparatus from the power-saving mode is receivable; and a controller configured to control, based on a condition that the human sensor detects a person in the first range, the communication equipment to enter a state where communication with the external equipment is available, and the first light-emitting equipment and the second light-emitting equipment to be lit, and then, based on a condition that the human sensor detects a person in the second range, the apparatus to return from the power-saving mode, and the second light-emitting equipment not to be lit while the first light-emitting equipment remains lit.

2. The apparatus according to claim 1, wherein the controller is configured to control, in a case where communication with the external equipment is performed, the operation mode to move into the normal power mode and the first light-emitting equipment not to be lit.

3. The apparatus according to claim 1, wherein the controller is configured to control, in a case where communication with the external equipment is performed, the operation mode to move into the normal power mode and the second light-emitting equipment not to be lit.

4. The apparatus according to claim 1, wherein the controller is configured to control, in a case where (a) a predetermined time has elapsed with a person detected in the second range by the human sensor, (b) the apparatus is in an operation mode that is an intermediate operation mode between the normal power mode and the power-saving mode, and (c) the second light-emitting equipment is controlled to be lit, the operation mode to move into the normal power mode and the second light-emitting equipment not to be lit.

5. The apparatus according to claim 1, further comprising a user interface configured to receive an input operation from a user, wherein the controller is configured to control, in a case where an operation to move into an operation mode in which data communication with the external equipment is enabled by pairing is performed via the user interface in the normal power mode, the first light-emitting equipment to be lit.

6. The apparatus according to claim 4, further comprising a user interface configured to receive an input operation from a user, wherein a position where the external equipment is to be held above the apparatus is provided in the user interface.

7. The apparatus according to claim 1, wherein the external equipment is an NFC compatible device and the wireless communication is NFC.

8. The apparatus according to claim 1, wherein the external equipment is an authentication card with which authentication of a user who uses the apparatus is performed.

9. The apparatus according to claim 8, wherein the controller is configured to control, in a case where information on the authentication card is read by the communication equipment, the first light-emitting equipment not to be lit.

10. The apparatus according to claim 1, wherein each of the first light-emitting equipment and the second light-emitting equipment includes an LED configured to provide the respective light.

11. The apparatus according to claim 1, wherein the first light-emitting equipment, the second light-emitting equipment, or each of the first light-emitting equipment and the second light-emitting equipment is configured to provide the respective light via blinking.

12. A control method of an apparatus including a plurality of operation modes, the plurality of operation modes including at least a normal power mode and a power-saving mode in which power consumption is lower than that in the normal power mode, wherein the apparatus comprises:
a human sensor configured to detect a person who exists within a predetermined range of the apparatus, the predetermined range including a first range and a second range closer to the apparatus than the first range as detection ranges;
communication equipment configured to wirelessly communicate with external equipment that is held above the apparatus;
first light-emitting equipment configured to be lit to provide light at a position where the external equipment is to be held above the apparatus; and
second light-emitting equipment configured to be lit to provide light at a position where a user instruction to return the apparatus from the power-saving mode is receivable, the control method comprising the steps of:
acquiring a detection state of a person by the human sensor; and
controlling, based on a condition that a person is detected in the acquiring step in the first range, the communication equipment to enter a state where communication with the external equipment is available, and the first light-emitting equipment and the second light-emitting equipment to be lit, and then, based on a condition that a person is detected in the acquiring step in the second range, the apparatus to return from the power-saving mode, and the second light-emitting equipment not to be lit while the first light-emitting equipment remains lit.

13. A non-transitory computer readable storage medium storing a program for causing a computer to perform a control method of an apparatus including a plurality of operation modes, the plurality of operation modes including at least a normal power mode and a power-saving mode in which power consumption is lower than that in the normal power mode, wherein the apparatus comprises:
a human sensor configured to detect a person who exists within a predetermined range of the apparatus, the predetermined range including a first range and a second range closer to the apparatus than the first range as detection ranges;
communication equipment configured to wirelessly communicate with external equipment that is held above the apparatus;
first light-emitting equipment configured to be lit to provide light at a position where the external equipment is to be held above the apparatus; and second light-emitting equipment configured to be lit to provide light at a position where a user instruction to return the apparatus from the power-saving mode is receivable, the control method comprising the steps of:

acquiring a detection state of a person by the human sensor; and controlling, based on a condition that the a person is detected in the acquiring step in the first range, the communication equipment to enter a state where communication with the external equipment is available, and the first light-emitting equipment and the second light-emitting equipment to be lit, and then, based on a condition that a person is detected in the acquiring step in the second range, the apparatus to return from the power-saving mode, and the second light-emitting equipment not to be lit while the first light-emitting equipment remains lit.

* * * * *